US012562520B2

(12) United States Patent
Valdes et al.

(10) Patent No.: US 12,562,520 B2
(45) Date of Patent: Feb. 24, 2026

(54) CONNECTOR ASSEMBLY WITH TERMINAL POSITION ASSURANCE AND BLOCKING FEATURE

(71) Applicant: Aptiv Technologies AG, Schaffhausen (CH)

(72) Inventors: Arturo Casares Valdes, Saltillo (MX); Eduardo Daniel Alvarez Valdez, Saltillo (MX); Roberto Narro, Saltillo (MX); Rangarajan Sundarakrishnamachari, Chennai (IN); Siddhan Manickam, Salem (IN); Dineshkumar Manoharan, Chennai (IN); Elias Vazquez, Saltillo (MX)

(73) Assignee: Aptiv Technologies AG, Schaffhausen (CH)

( * ) Notice: Subject to any disclaimer, the term of this patent is extended or adjusted under 35 U.S.C. 154(b) by 359 days.

(21) Appl. No.: 18/122,267

(22) Filed: Mar. 16, 2023

(65) Prior Publication Data

US 2024/0030643 A1 Jan. 25, 2024

Related U.S. Application Data

(60) Provisional application No. 63/431,378, filed on Dec. 9, 2022, provisional application No. 63/391,258, filed on Jul. 21, 2022.

(51) Int. Cl.
*H01R 13/436* (2006.01)
*H01R 13/52* (2006.01)

(52) U.S. Cl.
CPC ..... *H01R 13/4368* (2013.01); *H01R 13/5205* (2013.01)

(58) Field of Classification Search
CPC ............ H01R 13/4368; H01R 13/5205; H01R 13/434; H01R 13/4367; H01R 13/4223
(Continued)

(56) References Cited

U.S. PATENT DOCUMENTS 4,900,271 A 2/1990 Colleran et al.
5,575,692 A 11/1996 Cecil et al.
(Continued)

FOREIGN PATENT DOCUMENTS

DE 102018126448 A1 4/2020
EP 0452060 A1 10/1991

OTHER PUBLICATIONS

"Extended European Search Report"; European Patent Office; Mailed on Dec. 3, 2023; 12 Pages.

*Primary Examiner* — Christopher M Koehler
*Assistant Examiner* — Gregory L Mangot
(74) *Attorney, Agent, or Firm* — Billion & Armitage

(57) ABSTRACT

A connector assembly includes a connector body having a terminal cavity, a terminal lock configured to secure the terminal within the terminal cavity, and a rigid stop ridge projecting into the terminal cavity. The connector assembly also includes a TPA device moveable from a pre-staged position to a fully staged position deeper within the terminal cavity. The TPA device is inhibited from moving from the pre-staged position prior to the terminal insertion by interference between the TPA device and the stop ridge. The TPA device is inhibited from moving from the pre-staged position as the terminal is inserted into the terminal cavity by interference between the TPA device and the terminal lock. The TPA device is allowed to move from the pre-staged position to the fully staged position after the terminal is fully seated within the terminal cavity and the terminal lock secures the terminal within the terminal cavity.

20 Claims, 23 Drawing Sheets

(58) Field of Classification Search
USPC .......................................................... 439/589
See application file for complete search history.

(56) References Cited

U.S. PATENT DOCUMENTS

| | | | | |
|---|---|---|---|---|
| 9,935,389 | B1 | 4/2018 | Irish | |
| 10,811,804 | B1 | 10/2020 | Probert et al. | |
| 2001/0006861 | A1* | 7/2001 | Ohsumi ............. | H01R 13/4223 439/752 |
| 2007/0004279 | A1* | 1/2007 | Mori .................. | H01R 13/5208 439/587 |
| 2018/0019532 | A1 | 1/2018 | Uenosono et al. | |

* cited by examiner

CONNECTOR ASSEMBLY WITH TERMINAL POSITION ASSURANCE AND BLOCKING FEATURE

CROSS-REFERENCE TO RELATED APPLICATION

This application claims benefit of priority to U.S. Provisional Application No. 63/391,258 filed on Jul. 21, 2022, and U.S. Provisional Application No. 63/431,378 filed on Dec. 9, 2022, the entire disclosure of each of which is hereby incorporated by reference.

FIELD OF THE INVENTION

This patent application is directed to a connector assembly having a terminal position assurance with a blocking feature that prevents movement from a pre-staged position to a full-staged position prior to insertion of a terminal.

BACKGROUND

Connector assemblies, particularly electrical connector assemblies, oftentimes make use of a terminal position assurance (TPA) device to ensure complete and correct insertion of the terminals. In some applications, such as sealed connector assemblies, TPA devices are typically restricted to use on the back of the connector assembly. This can increase the time and/or cost associated with assembling terminals within the connector assembly. It would be beneficial to provide connector assemblies having TPA devices that are easier to assemble.

BRIEF SUMMARY

According to one or more aspects of the present disclosure, a connector assembly includes a connector body having a terminal cavity configured to receive a terminal, a flexible terminal lock configured to secure the terminal within the terminal cavity, and a stop ridge projecting from an inner wall of the connector body into the terminal cavity; and a terminal position assurance (TPA) device inserted within the terminal cavity and moveable from a pre-staged position to a fully staged position deeper within the terminal cavity. The TPA device is inhibited from moving from the pre-staged position to the fully staged position prior to the terminal being inserted into the terminal cavity by a first blocking condition caused by interference between the TPA device and the stop ridge. The TPA device is inhibited from moving from the pre-staged position to the fully staged position as the terminal is inserted into the terminal cavity by a second blocking condition caused by interference between the TPA device and the terminal lock as the terminal lock is flexed by the terminal. The TPA device is allowed to move from the pre-staged position to the fully staged position after the terminal is fully seated within the terminal cavity and the terminal lock returns to an unflexed condition.

In some aspects of the connector assembly according to the previous paragraph, a cantilevered flexible arm of the TPA device engages the stop ridge in the first blocking condition and wherein the terminal comes in contact with the flexible arm and moves the flexible arm out of engagement with the stop ridge as the terminal is inserted within the terminal cavity, thereby clearing the first blocking condition.

In some aspects of the connector assembly according to any one of the previous paragraphs, a free end of the flexible arm defines a ramp configured to contact the terminal and move the flexible arm out of engagement with the stop ridge as the terminal is inserted within the terminal cavity, thereby clearing the first blocking condition.

In some aspects of the connector assembly according to any one of the previous paragraphs, the flexible arm has an arcuate shape with a free end of the flexible arm being closer to a centerline of the connector body than a fixed end of the flexible arm when the flexible arm prior to insertion of the terminal within the terminal cavity.

In some aspects of the connector assembly according to any one of the previous paragraphs, the stop ridge is mounted on a pedestal extending from inner wall of the connector body and wherein the flexible arm is disposed between the stop and the inner wall after the flexible arm is flexed out of engagement with the stop ridge.

In some aspects of the connector assembly according to any one of the previous paragraphs, the flexible arm is disposed between the terminal lock and the inner wall of the connector body when the TPA device is in the fully staged position.

In some aspects of the connector assembly according to any one of the previous paragraphs, the terminal and the TPA devices are inserted into a common end of the connector body.

In some aspects of the connector assembly according to any one of the previous paragraphs, the terminal and the TPA devices are inserted into opposite ends of the connector body.

In some aspects of the connector assembly according to any one of the previous paragraphs, the connector assembly further includes a cable seal disposed between the inner wall of the terminal cavity and an electrical cable attached to the terminal; and a cable seal retainer attached to the connector body and configured to be moveable from the pre-staged position to the fully staged position when the TPA device is moved from the pre-staged position to the fully staged position.

In some aspects of the connector assembly according to any one of the previous paragraphs, the cable seal retainer is blocked from moving from the pre-staged position to the fully staged position when the TPA device is in the pre-staged position.

In some aspects of the connector assembly according to any one of the previous paragraphs, the cable seal retainer and the TPA device are formed as an integral unit.

In some aspects of the connector assembly according to any one of the previous paragraphs, the cable seal retainer, the TPA device, and the cable seal are formed as an integral unit. The cable seal retainer further includes a connector body seal disposed between the cable seal retainer and the connector body.

In some aspects of the connector assembly according to any one of the previous paragraphs, the cable seal retainer is integrally formed with the connector body seal.

According to one or more aspects of the present disclosure, a method of assembling a connector includes the steps of:

- inserting a terminal position assurance (TPA) device within a terminal cavity of a connector body and holding the TPA device in a pre-staged position via contact between a stop ridge projecting from an inner wall of the connector body into the terminal cavity and a free end of a cantilevered flexible arm extending from the TPA device, thereby creating a first blocking condition for the TPA device;
- partially inserting a terminal within the terminal cavity which contacts the flexible arm, thereby moving the free end out of contact with the stop ridge and clearing the first blocking condition for the TPA device, wherein the terminal further comes in contact with a flexible terminal lock and pushes the terminal lock into contact with a rigid tab defined by the TPA device, thereby holding the TPA device in the pre-staged position by creating a second blocking condition for the TPA device;

fully inserting the terminal within the terminal cavity, wherein the terminal lock engages the terminal is returned to an unflexed condition, thereby moving the terminal lock out of contact with the rigid tab, clearing the second blocking condition, and creating a non-blocking condition for the TPA device that allows the TPA device to be moved from the pre-staged position to a fully staged position; and moving the TPA device from the pre-staged position to the fully staged position.

In some aspects of the method according to the previous paragraph, the flexible arm is disposed between the terminal lock and the inner wall of the connector body when the TPA device is in the fully staged position.

In some aspects of the method according to any one of the previous paragraphs, the method further includes the steps of:

inserting a cable seal between the inner wall of the terminal cavity and an electrical cable attached to the terminal; and attaching a cable seal retainer to the connector body, wherein the cable seal retainer is moveable from the pre-staged position to the fully staged position only when the TPA device is moveable from the pre-staged position to the fully staged position.

In some aspects of the method according to any one of the previous paragraphs, the method further includes the steps of forming the TPA device and the cable seal retainer as an integral unit.

According to one or more aspects of the present disclosure, a connector assembly is manufactured by a process including the steps of:

inserting a terminal position assurance (TPA) device within a terminal cavity of a connector body and holding the TPA device in a pre-staged position via contact between a stop ridge projecting from an inner wall of the connector body into the terminal cavity and a free end of a cantilevered flexible arm extending from the TPA device, thereby creating a first blocking condition for the TPA device;

partially inserting a terminal within the terminal cavity which contacts the flexible arm, thereby moving the free end out of contact with the stop ridge and clearing the first blocking condition for the TPA device, wherein the terminal further comes in contact with a flexible terminal lock and pushes the terminal lock into contact with a rigid tab defined by the TPA device, thereby holding the TPA device in the pre-staged position by creating a second blocking condition for the TPA device;

fully inserting the terminal within the terminal cavity, wherein the terminal lock engages the terminal is returned to an unflexed condition, thereby moving the terminal lock out of contact with the rigid tab, clearing the second blocking condition, and creating a non-blocking condition for the TPA device that allows the TPA device to be moved from the pre-staged position to a fully staged position; and moving the TPA device from the pre-staged position to the fully staged position.

In some aspects of the method according to the previous paragraph, the process further includes the steps of:

inserting a cable seal between the inner wall of the terminal cavity and an electrical cable attached to the terminal; and attaching a cable seal retainer to the connector body, wherein the cable seal retainer is moveable from the pre-staged position to the fully staged position only when the TPA device is moveable from the pre-staged position to the fully staged position.

In some aspects of the method according to any one of the previous paragraphs, the process further includes the steps of forming the TPA device and the cable seal retainer as an integral unit.

DESCRIPTION OF THE DRAWINGS

FIG. 20 is a cross section side view of the integrated seal retainer/TPA device of FIG. 19;

DETAILED DESCRIPTION

Figure 1:
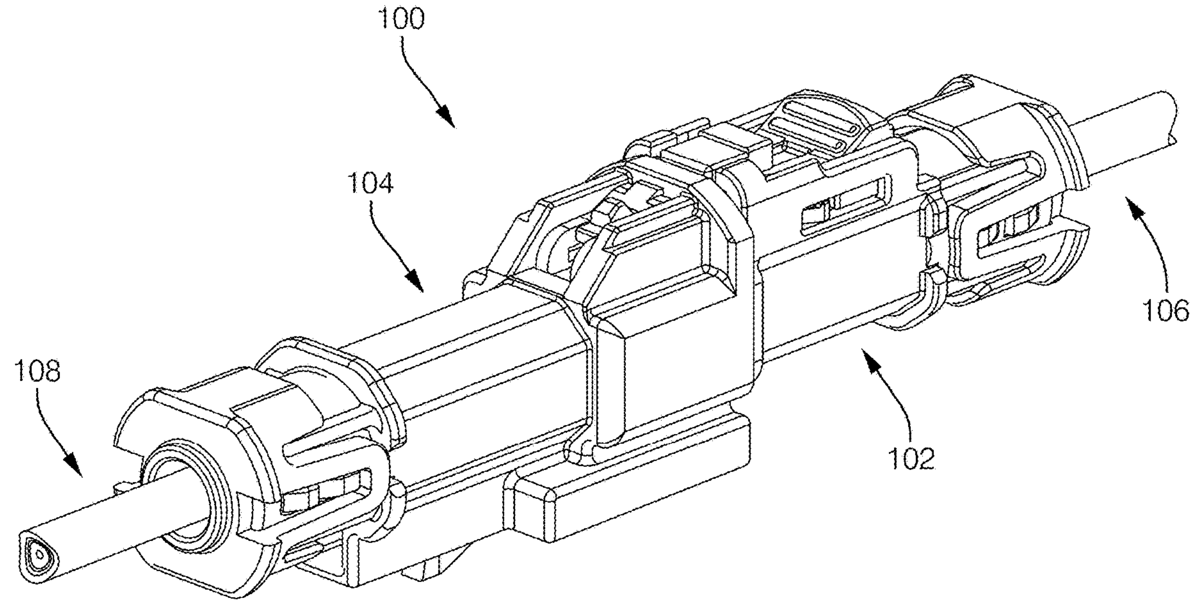
FIG. 1 is an isometric view of a connector assembly according to some embodiments.

FIGS. 1 to 16 show a non-limiting example of a coaxial electrical connector assembly, hereafter referred to as the assembly 100, according to some embodiments. The assembly 100 includes a female connector 102 and a mating male connector 104. The female and male connectors 102, 104 terminate coaxial cables 106, 108, respectively.

Figure 2:
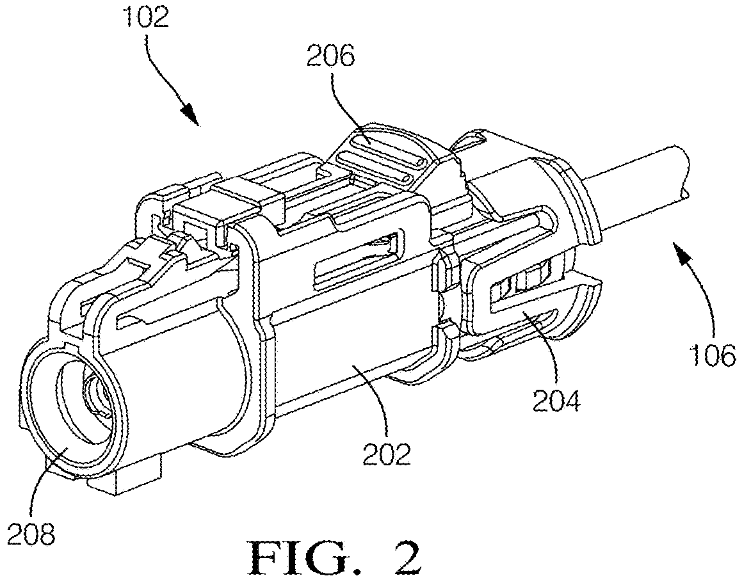
FIG. 2 is an isometric view of a female connector of the connector assembly of FIG. 1 according to some embodiments.
Figure 3:
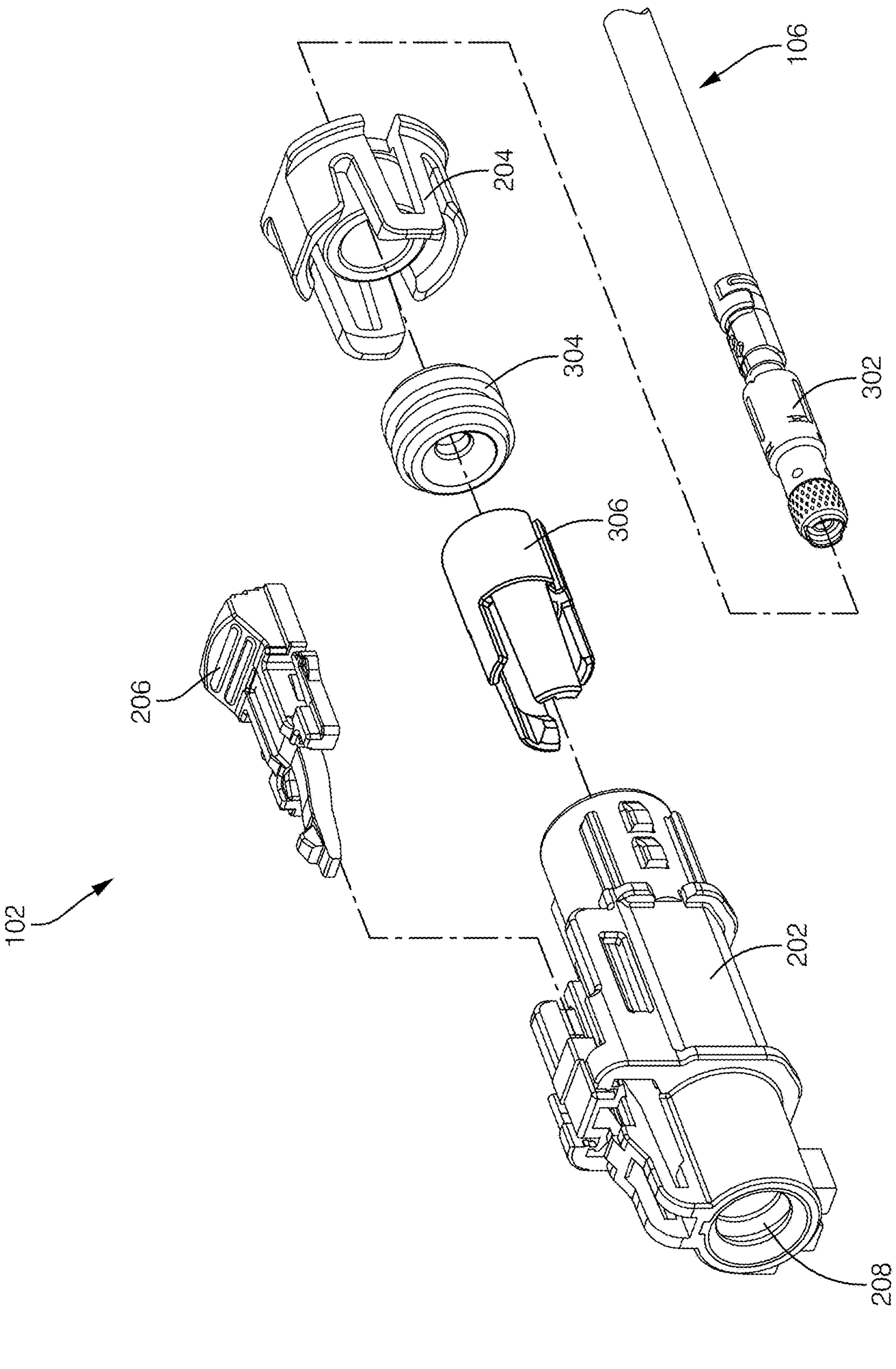
FIG. 3 is an exploded view of the female connector of FIG. 2 according to some embodiments.

The female connector 102 is illustrated in FIGS. 2-12B. As shown in FIG. 2, the female connector 102 has a female connector body 202 formed of an electrically insulative material such as polyamide (NYLON) or polybutylene terephthalate (PBT). The female connector 102 also has a cable seal retainer 204 that holds a cable seal 304 within a terminal cavity 402 (see FIG. 4A) of the female connector body 202, a connector position assurance (CPA) device 206 that locks the female connector 102 to the male connector 104 when they are fully and properly mated, and a connector seal 208 that inhibits environmental contaminants, such as water and dust, from intruding into the interface between the female and male connectors 102, 104. The exploded view of the female connector 102 in FIG. 3 also shows a female coaxial terminal, hereafter referred to as the female terminal 302, connected to the coaxial cable 106, the cable seal 304 that is disposed between an inner wall 404 (see FIG. 4A) of the terminal cavity 402 and the coaxial cable 106 (see FIG. 4A) and a terminal position assurance (TPA) device 306 that is configured to assure that the female terminal 302 is properly seated within the terminal cavity 402. The female connector 102 is configured such that the TPA device 306 is blocked from moving from a pre-staged position 502 (see FIG. 5A) in a more rearward portion of the female connector body 202 to a fully staged position 1102 (see FIG. 11A) in a more forward portion of the female connector body 202 unless the female terminal 302 is properly seated within the terminal cavity 402.

The cable seal retainer 204 is configured to move the TPA device 306 from the pre-staged position 502 to the fully staged position 1102 by pushing the cable seal 304 and TPA device 306 into the terminal cavity 402. As shown in the cross-section views of FIGS. 4A and 4B, the cable seal retainer 204 is attached to the female connector body 202 by a latching mechanism 406 that engages a pre-staged stop 408 on an outer wall 412 of the female connector body 202 and engages a fully staged stop 410 on the outer wall 412 of the female connector body 202.

Figure 4A:
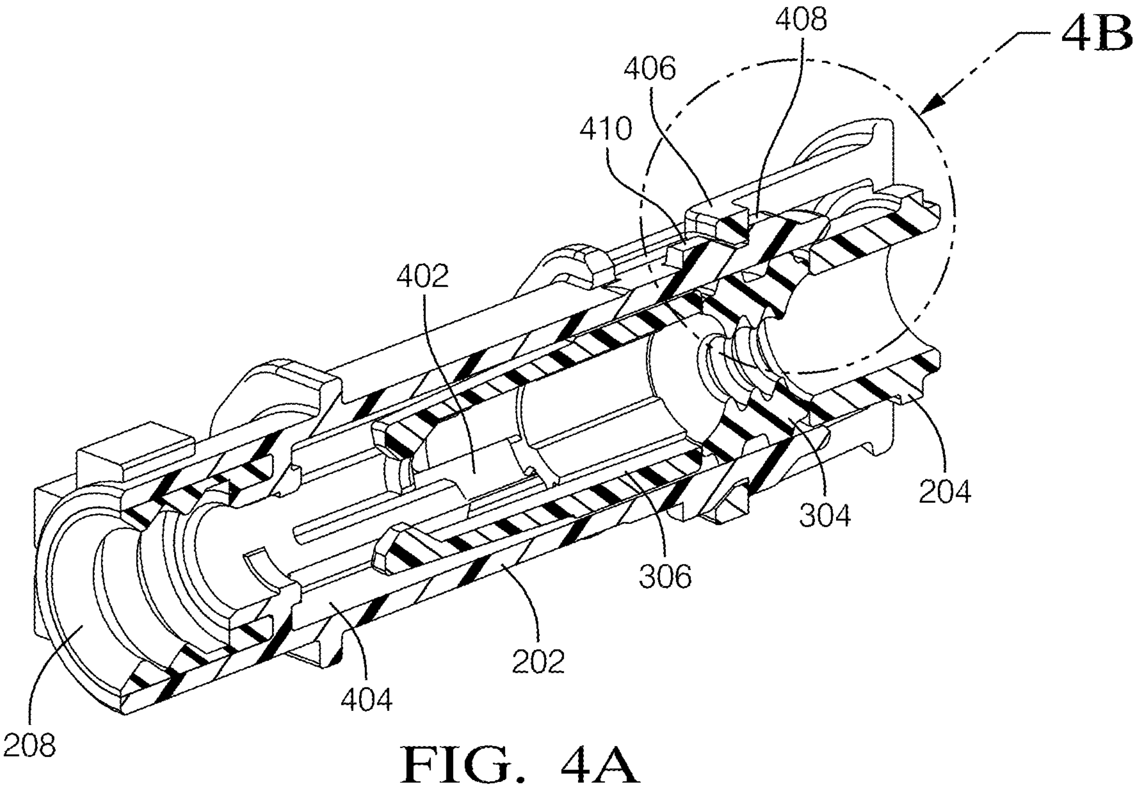
FIG. 4A is an isometric cross-sectional view of the female connector of FIG. 2 with a seal retainer in a pre-staged position according to some embodiments.
Figure 4B:
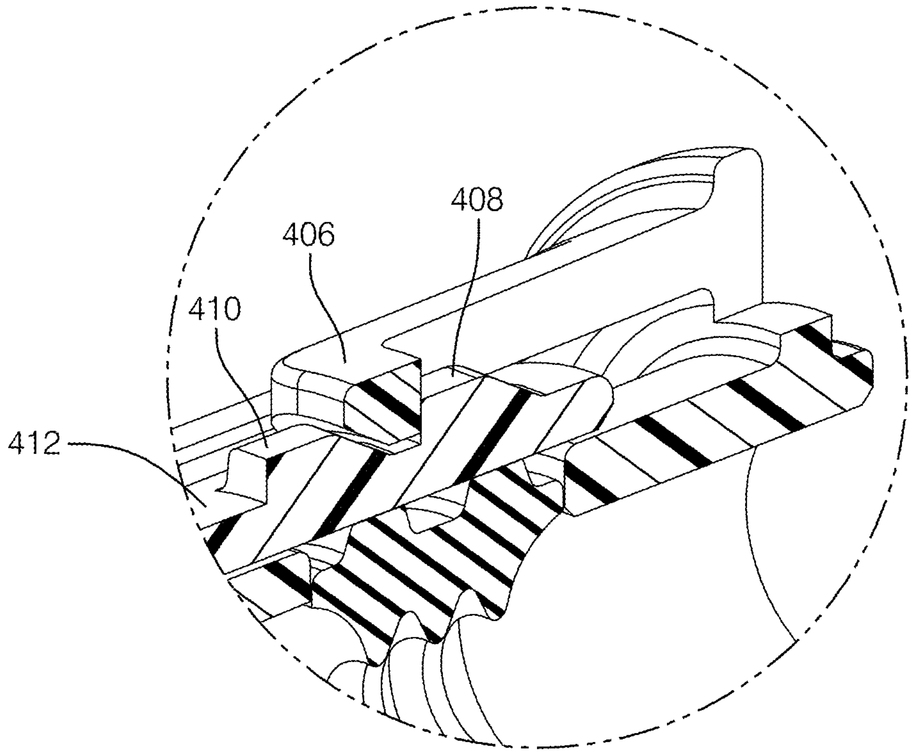
FIG. 4B is a close-up isometric cross-sectional view of the female connector of FIG. 4A showing the seal retainer in the pre-staged position according to some embodiments.
Figure 5A:
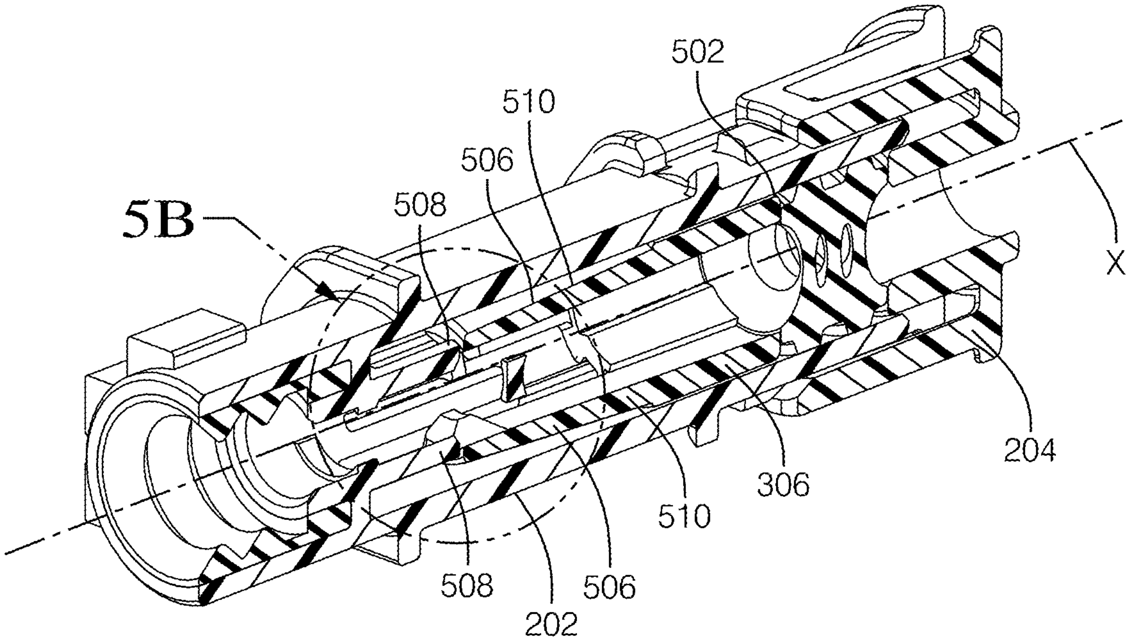
FIG. 5A is a different isometric cross-sectional view of the female connector of FIG. 2 showing a stop ridge and a terminal position assurance (TPA) device in a first blocking condition when the TPA device and seal retainer are in the pre-staged position prior to insertion of a terminal according to some embodiments.
Figure 5B:
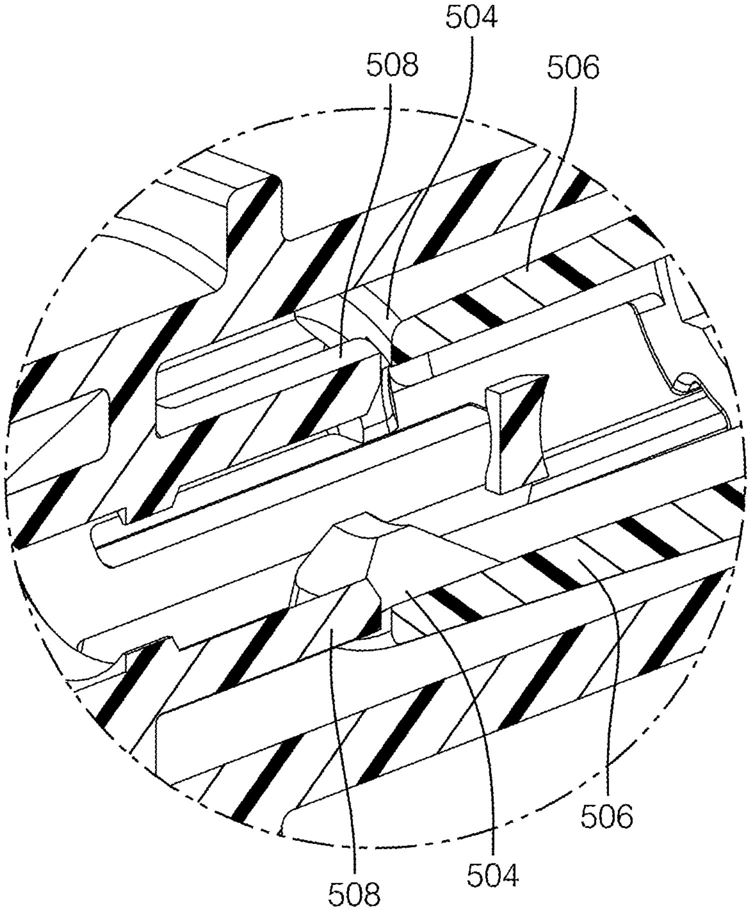
FIG. 5B is a close-up isometric cross-sectional view of the female connector of FIG. 5A showing the stop ridge and the TPA device in the first blocking condition according to some embodiments.
Figure 6:
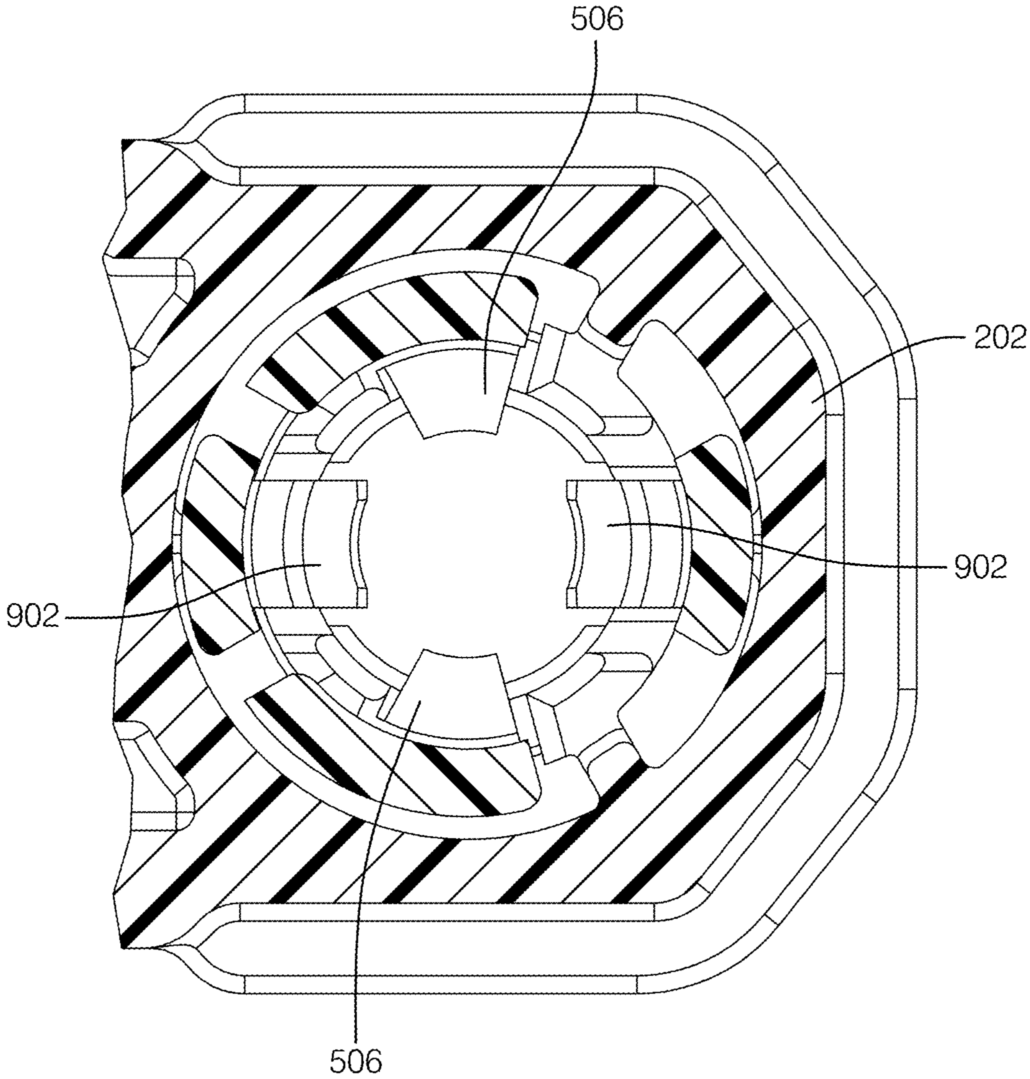
FIG. 6 is an end cross-sectional view of the female connector of FIG. 2 showing the stop ridge and the TPA device in the first blocking condition when in TPA device and seal retainer are in the pre-staged position prior to insertion of the terminal according to some embodiments.

FIGS. 5A and 5B show cross-section views that are slightly different than those shown in FIGS. 4A and 4B and illustrate a first blocking condition that holds the TPA device 306 in the pre-staged position 502 before the female terminal 302 is inserted within the terminal cavity 402. In the first blocking condition, free ends 504 of cantilevered flexible arms 506 extending from the TPA device 306 are in contact with stop ridges 508 extending from the inner wall 404 of the terminal cavity 402, thereby blocking the TPA device 306 from being inserted further within the terminal cavity 402. The stop ridges 508 are generally rigid.

As can be seen in FIGS. 5A and 5B, the flexible arms 506 have arcuate shapes such that the free ends 504 are located closer to a longitudinal centerline X of the terminal cavity 402 than fixed ends 510 of the flexible arms 506 when they are in a relaxed condition prior to insertion of the female terminal 302. The arcuate shape of the flexible arms 506 can clearly be seen in FIG. 6.

Figure 7A:
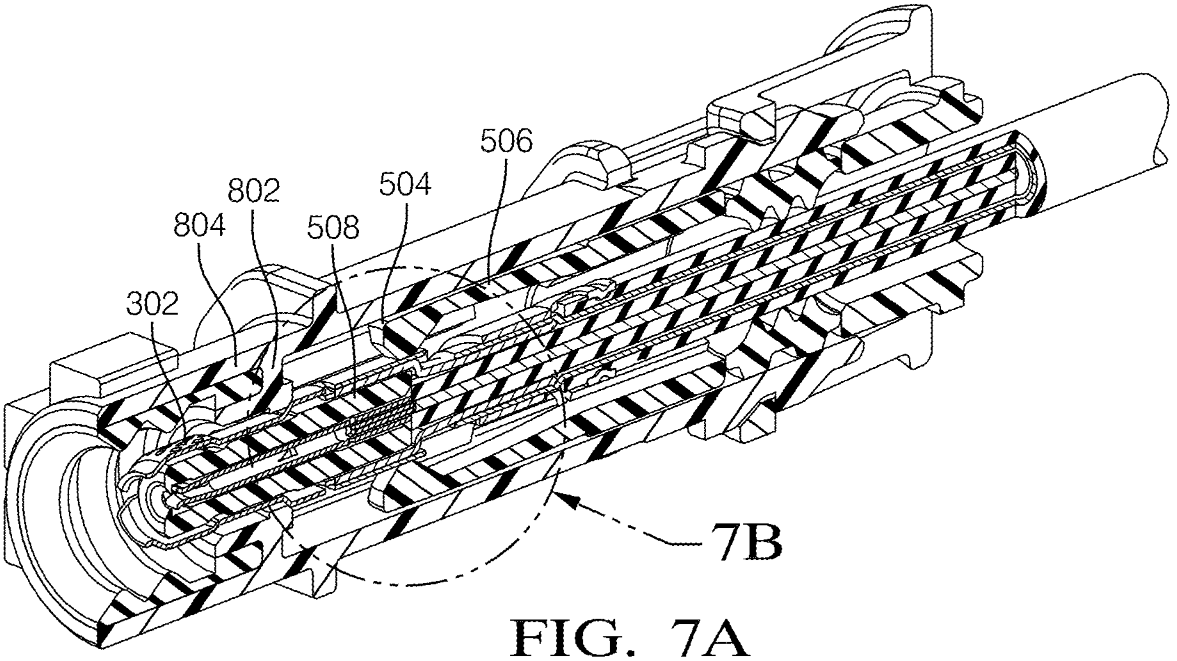
FIG. 7A is an isometric cross-sectional view of the female connector of FIG. 2 showing the female terminal contacting a ramp on the free ends of the flexible arms and pushing the flexible arms outwardly during insertion of the terminal according to some embodiments.
Figure 7B:
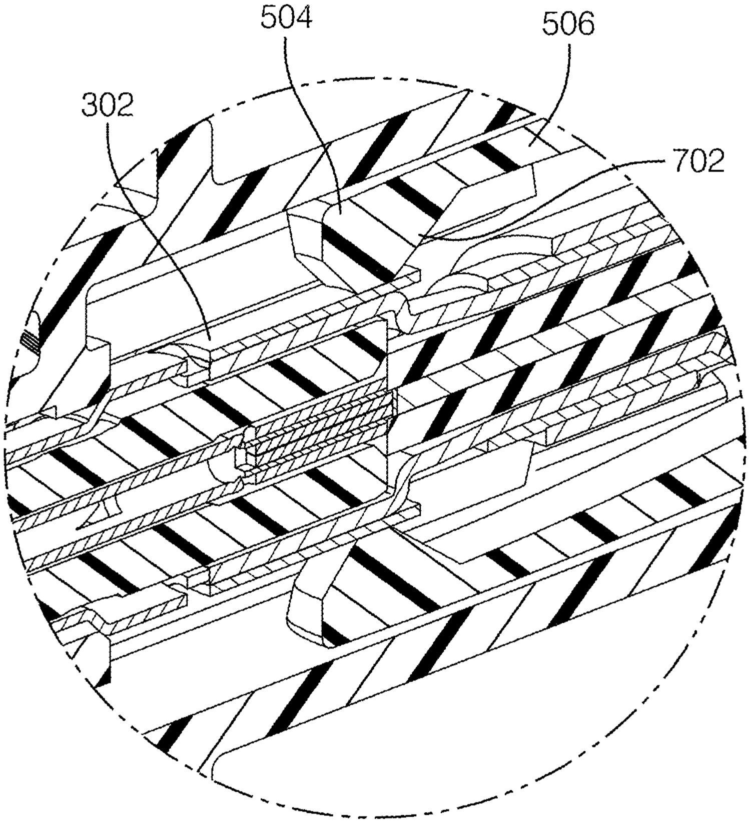
FIG. 7B is a close-up isometric cross-sectional view of the female connector of FIG. 7A showing the female terminal contacting a ramp on the free ends of the flexible arms and pushing the flexible arms outwardly according to some embodiments.
Figure 8A:
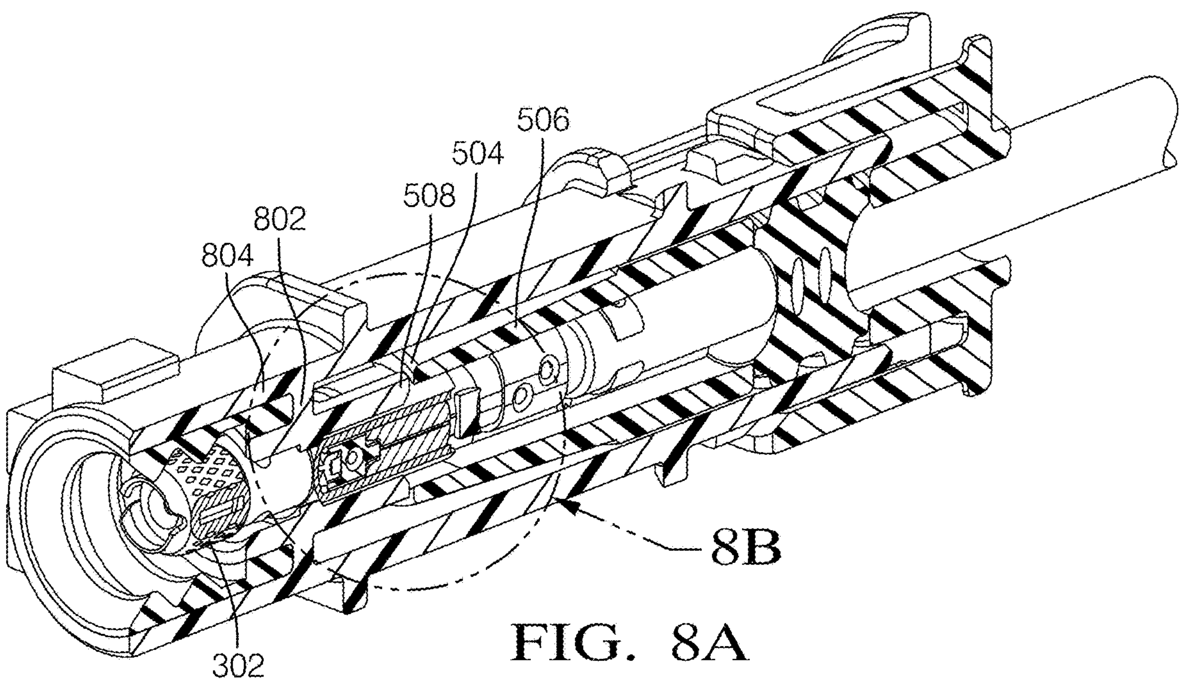
FIG. 8A is an isometric cross-sectional view of the female connector of FIG. 2 showing the free ends of flexible arms disengaging from the stop ridges, thereby clearing the first blocking condition during insertion of the terminal according to some embodiments.
Figure 8B:
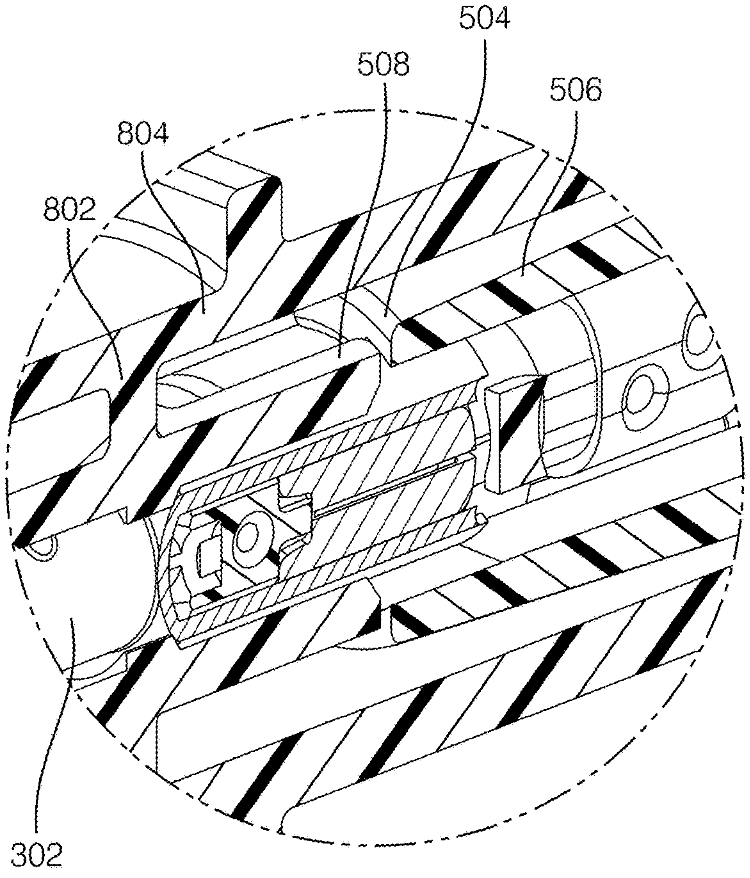
FIG. 8B is a close-up isometric cross-sectional view of the female connector of FIG. 8A showing the free ends of flexible arms disengaging from the stop ridges according to some embodiments.

FIGS. 7A though 9B show cross section views of the female connector 102 as the female terminal 302 is being inserted within the terminal cavity 402. As seen in FIGS. 7A and 7B, the female terminal 302 contacts a ramp 702 on the free ends 504 of the flexible arms 506 and pushes the flexible arms 506 outwardly, i.e., away from the centerline X of the terminal cavity 402. This outward flexing of the flexible arms 506 disengages the free ends 504 of the flexible arms 506 from the stop ridges 508 as shown in FIGS. 8A and 8B, thereby clearing the first blocking condition. The stop ridges 508 are mounted on a pedestals 802 extending from an inner wall 804 of the connector body 202 and the flexible arm 506 are disposed between the stop ridge 508 and the inner wall 804 after the flexible arm 506 flexes out of engagement with the stop ridge 508.

Figure 9A:
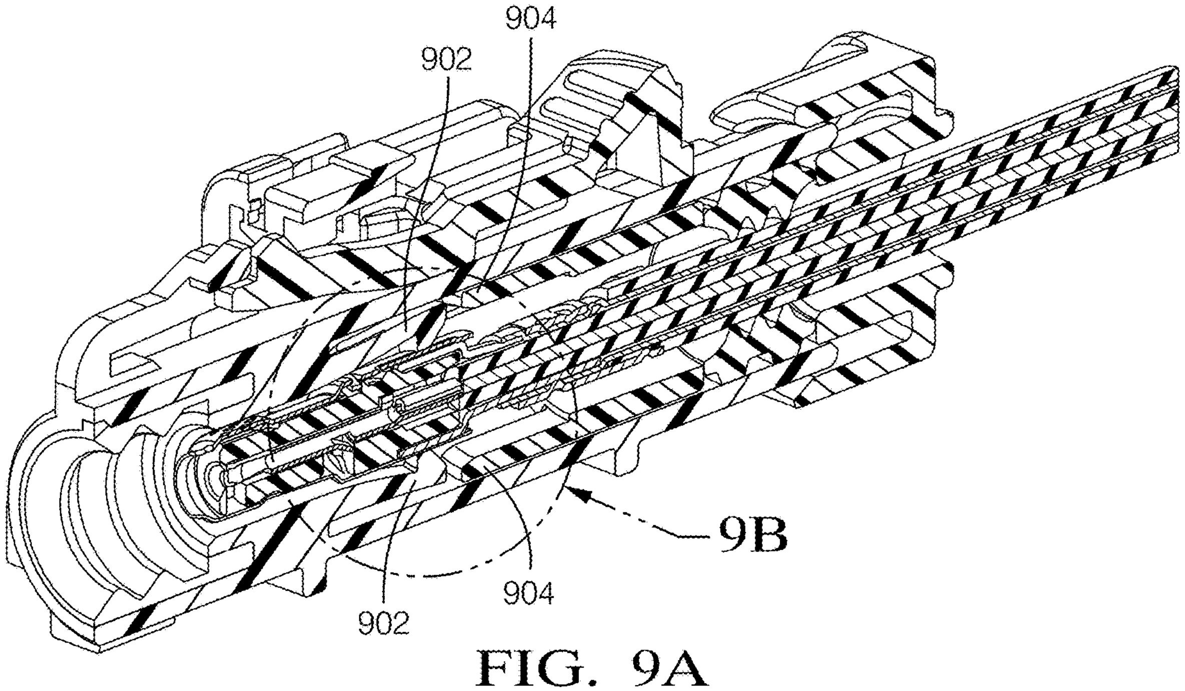
FIG. 9A is an isometric cross-sectional view of the female connector of FIG. 2 showing a terminal lock in a flexed condition and the TPA device in a second blocking condition when the TPA device and the seal retainer are in the pre-staged position during insertion of the terminal according to some embodiments.
Figure 9B:
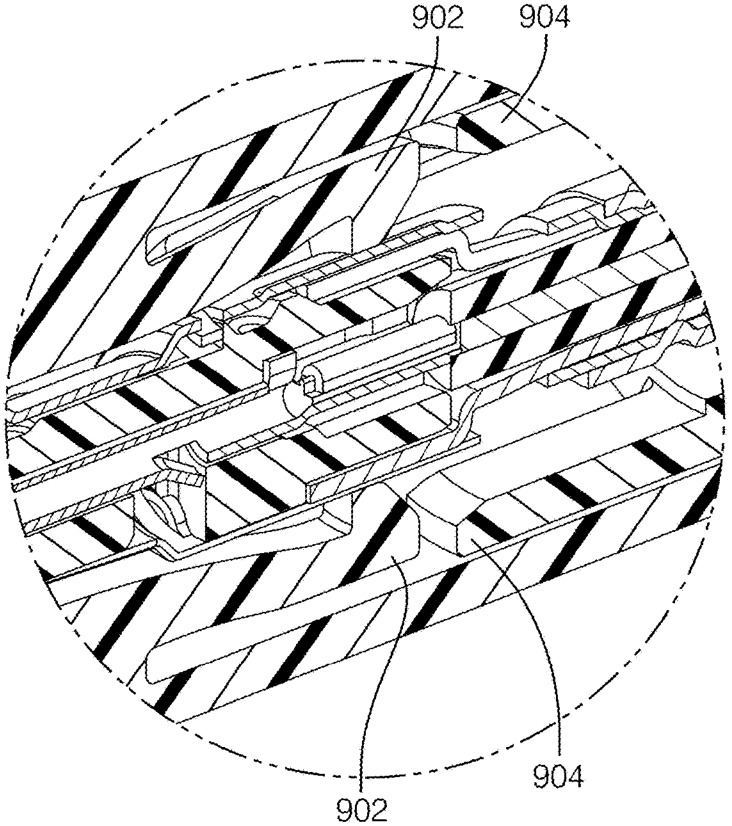
FIG. 9B is a close-up isometric cross-sectional view of the female connector of FIG. 9A showing the terminal lock in the flexed condition and the TPA device in the second blocking condition according to some embodiments.

However, as shown in FIGS. 9A and 9B, the female terminal 302 causes terminal locking arms 902 that are configured to retain the female terminal 302 within the terminal cavity 402 to flex outwardly and creating a second blocking condition between the terminal locking arms 902 and tabs 904 extending from the TPA device 306 that further blocks the TPA device 306 from moving from the pre-staged position 502 to the fully staged position 1102. The tabs 904 are generally rigid.

Figure 10A:
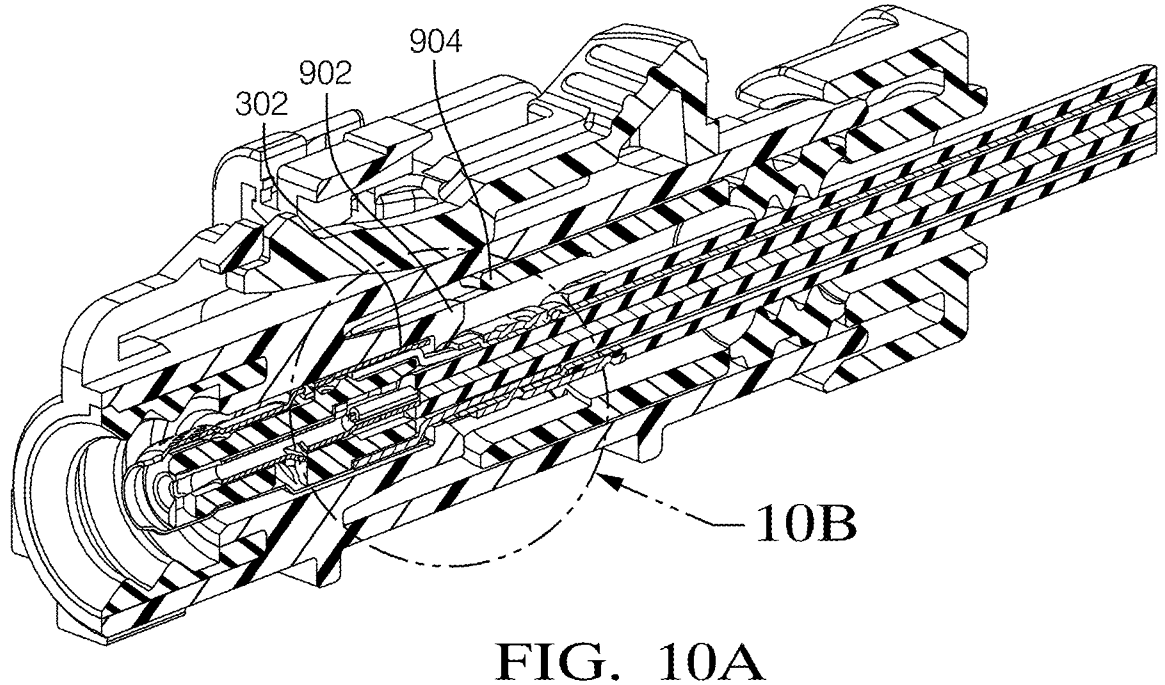
FIG. 10A is an isometric cross-sectional view of the female connector of FIG. 2 showing the terminal lock in an unflexed condition engaging the terminal and the TPA device in a non-blocking condition when in TPA device and seal retainer are in the pre-staged position after the terminal is fully inserted according to some embodiments.
Figure 10B:
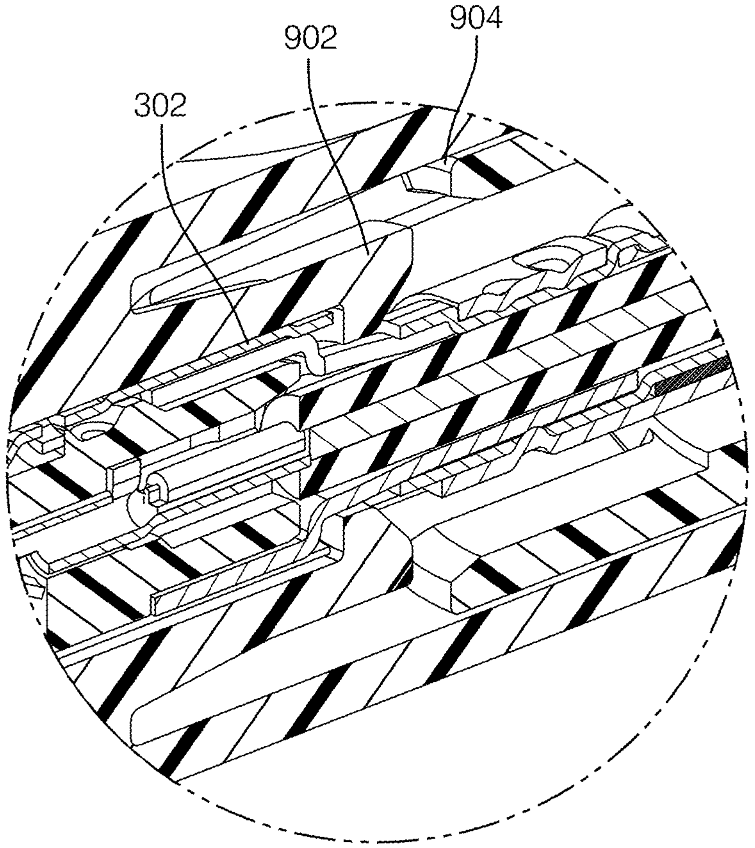
FIG. 10B is a close-up isometric cross-sectional view of the female connector of FIG. 10A showing the terminal lock in the unflexed condition engaging the terminal and the TPA device in a non-blocking condition according to some embodiments.

FIGS. 10A and 10B show cross section views of the female terminal 302 being fully seated within the terminal cavity 402 with the terminal locking arms 902 in their unflexed condition and engaging the female terminal 302 and securing it within the terminal cavity 402 while the TPA device 306 is still in the pre-staged position 502. As can be seen, the terminal locking arms 902 and rigid tabs 904 are no longer in contact or blocking one another. Thus, the second blocking condition has been cleared and a non-blocking condition has been created that allows the TPA device 306 to now move from the pre-staged position 502 to the fully staged position 1102.

Figure 11A:
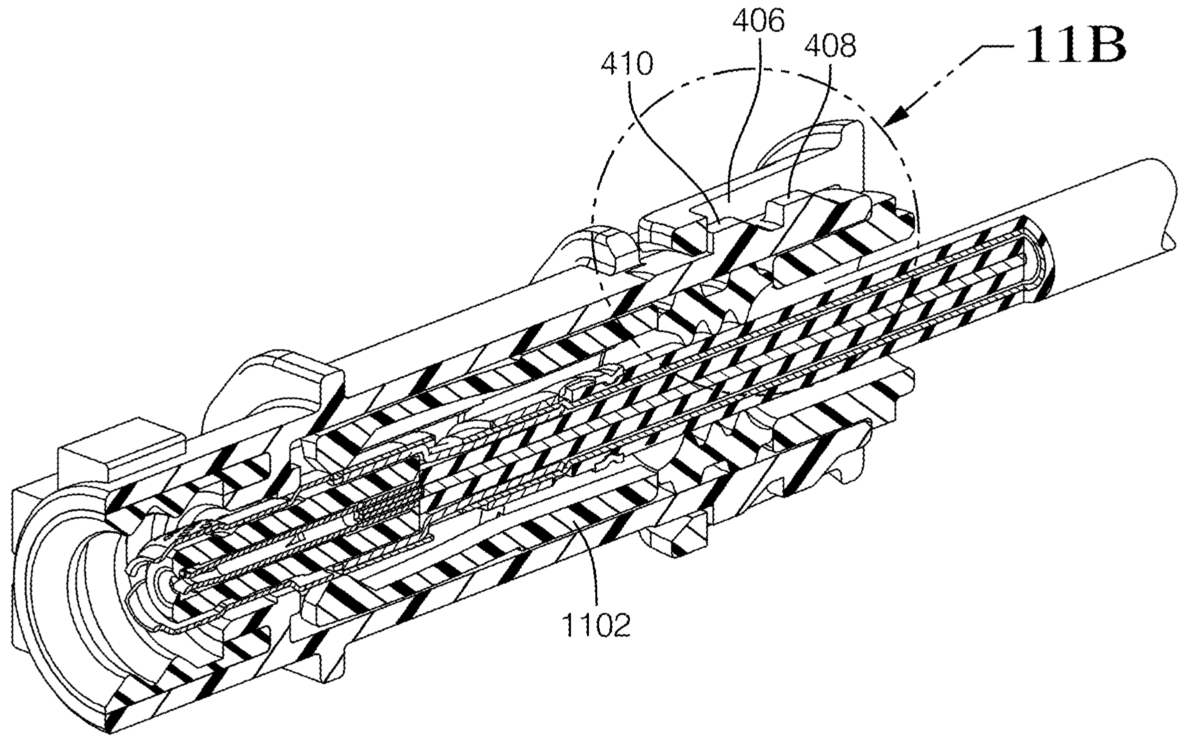
FIG. 11A is an isometric cross-sectional view of the female connector of FIG. 2 with the seal retainer in a fully staged position according to some embodiments.
Figure 11B:
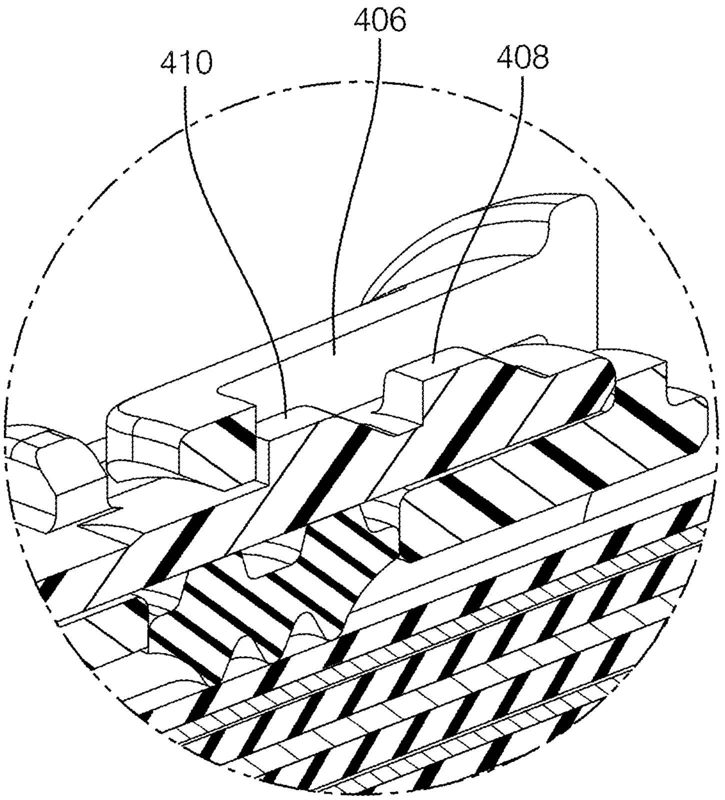
FIG. 11B is a close-up isometric cross-sectional view of the female connector of FIG. 11A showing the seal retainer in the fully staged position according to some embodiments.
Figure 12A:
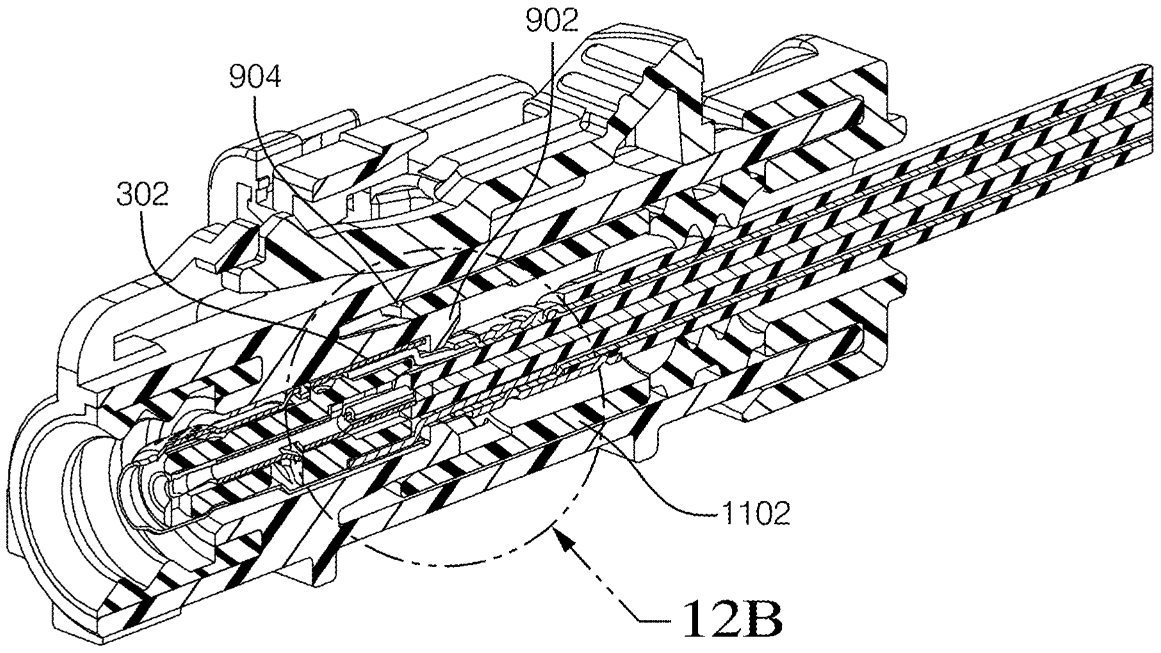
FIG. 12A is a different isometric cross-sectional view of the female connector of FIG. 2 showing the TPA device in the non-blocking condition and providing primary lock reinforcement (PLR) for the terminal lock when the TPA device and the seal retainer are in the fully staged position after the terminal is fully inserted according to some embodiments.
Figure 12B:
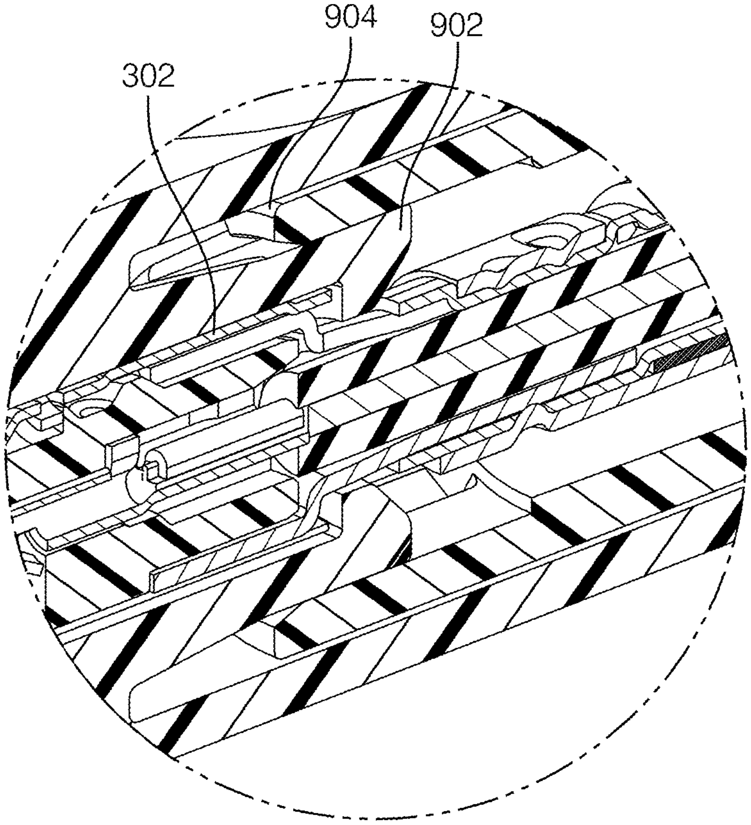
FIG. 12B is a close-up isometric cross-sectional view of the female connector of FIG. 11A showing the TPA device and the seal retainer in the fully staged position according to some embodiments.

FIGS. 11A through 12B show cross section views of the TPA device 306 in the fully staged position 1102. FIGS. 11A and 11B illustrate the cable seal retainer 204 also in its fully staged position with the latching mechanism 406 of the cable seal retainer 204 engaged with the fully staged stop 410. FIGS. 12A and 12B show the rigid tabs 904 of the TPA device 306 disposed between the terminal locking arms 902 and the inner wall 404 of the terminal cavity 402, thereby providing positive lock reinforcement features that inhibits the terminal locking arms 902 from inadvertently releasing the female terminal 302.

Figure 13:
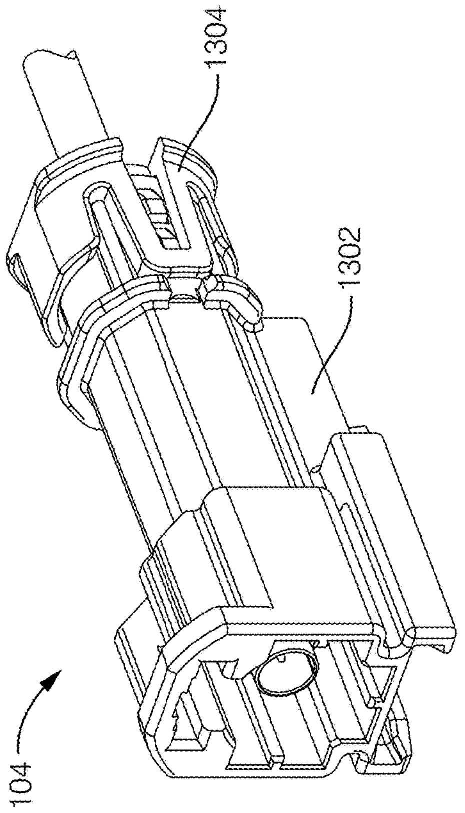
FIG. 13 is an isometric view of a male connector of the connector assembly of FIG. 1 according to some embodiments.
Figure 14:
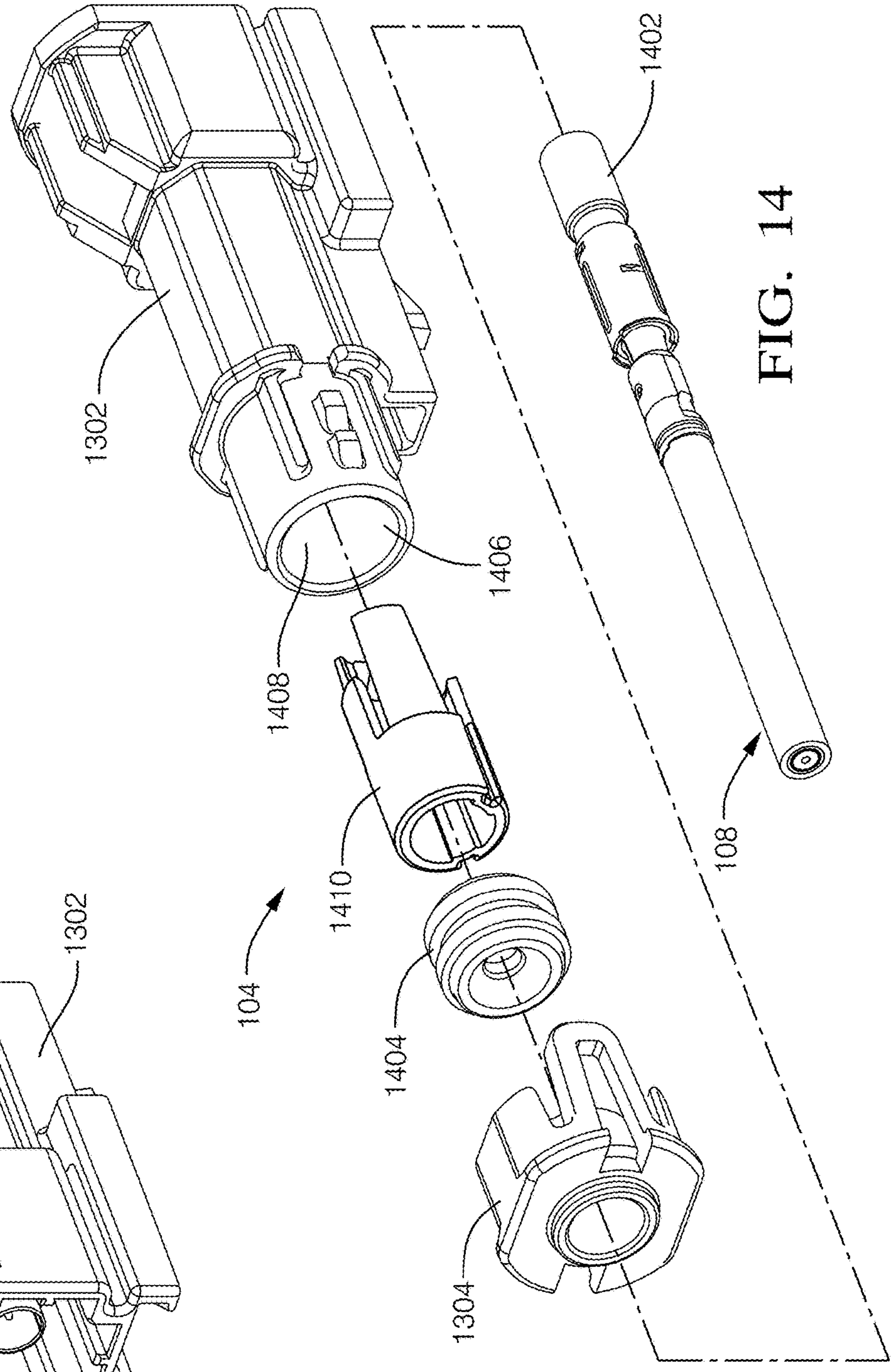
FIG. 14 is an exploded view of the male connector of FIG. 13 according to some embodiments.

The male connector 104 is illustrated in FIGS. 13-16B. As shown in FIG. 13, the male connector 104 has a male connector body 1302 formed of an electrically insulative material such as polyamide (NYLON) or polybutylene terephthalate (PBT). The male connector 104 also has a cable seal retainer 1304. The exploded view of the male connector 104 in FIG. 14 also shows a male coaxial terminal, hereafter referred to as the male terminal 1402, connected to the coaxial cable 108, a cable seal 1404 that is disposed between an inner wall 1406 of a terminal cavity 1408 of the male connector body 1302 and the coaxial cable 108 (see FIG. 15A). The cable seal 1404 is held within the terminal cavity 1408 by the cable seal retainer 1304. The male connector 104 further includes a terminal position assurance (TPA) device 1410 that is configured to assure that the male terminal 1402 is properly seated within the terminal cavity 1408. The male connector 104 is configured such that the TPA device 1410 is blocked from moving from a pre-staged position in a more rearward portion of the male connector body 1302 to a fully staged position 1502 in a more forward portion of the male connector body 1302 unless the male terminal 1402 is properly seated within the terminal cavity 1408, similarly to the operation of the TPA device 306 in the female connector 102.

Figure 15A:
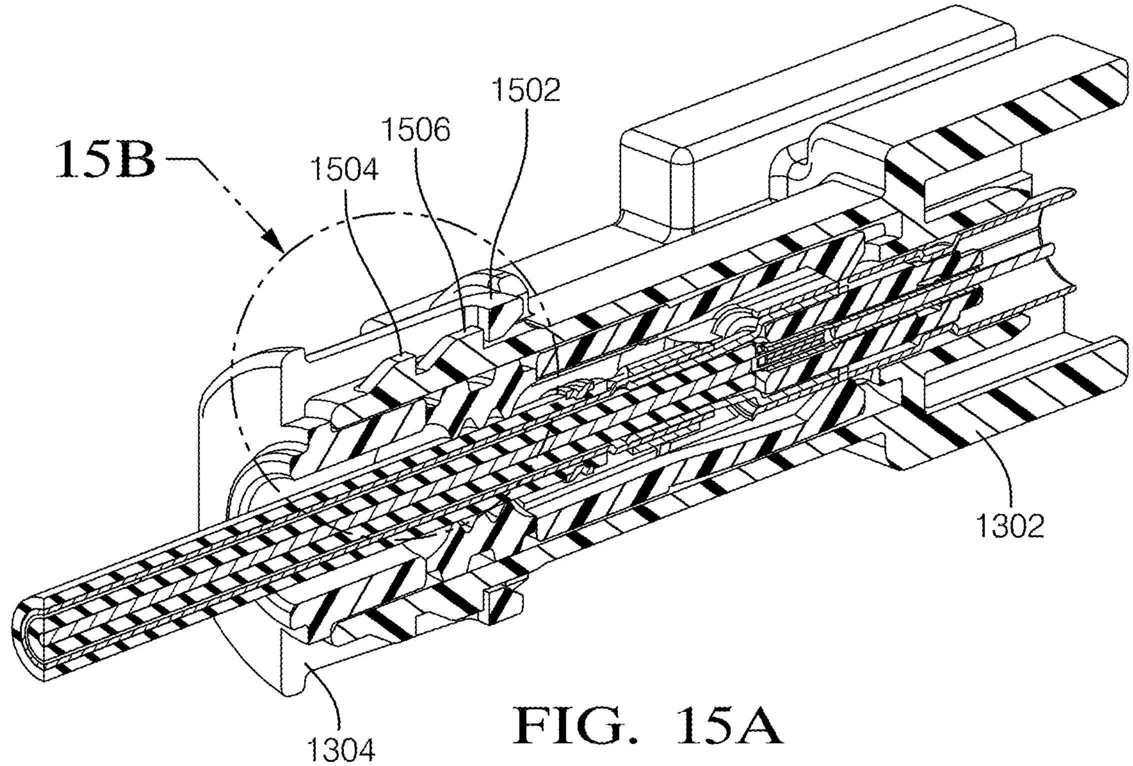
FIG. 15A is an isometric cross-sectional view of the male connector of FIG. 13 with a seal retainer in a pre-staged position according to some embodiments.
Figure 15B:
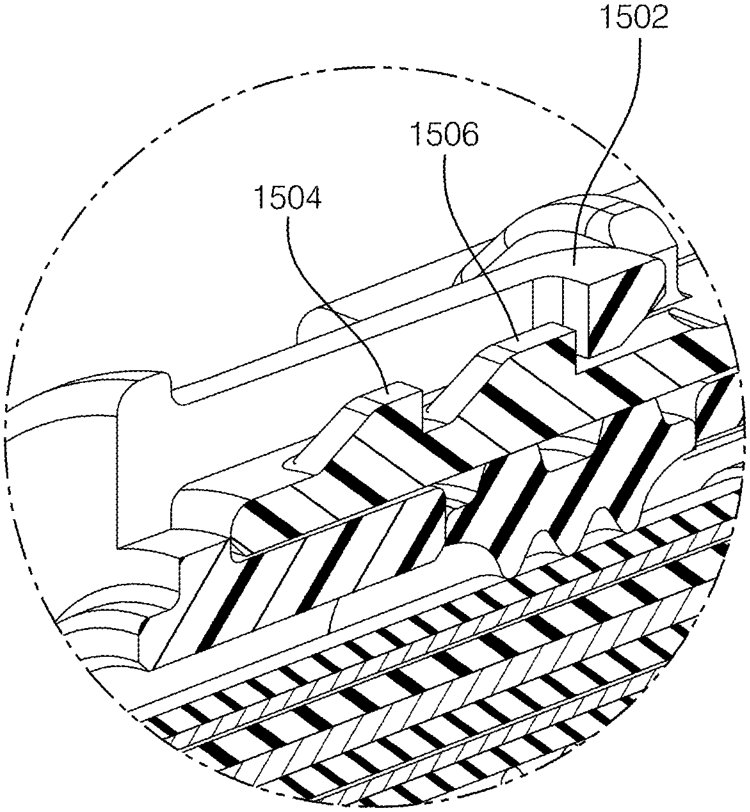
FIG. 15B is a close-up isometric cross-sectional view of the male connector of FIG. 13A showing the seal retainer in the pre-staged position according to some embodiments.

The cable seal retainer 1304 is configured to move the TPA device 1410 from the pre-staged position to the fully staged position by pushing the cable seal 1404 and TPA device 1410 into the terminal cavity 1408. FIGS. 15A and 15B show cross section views of the TPA device 1410 in the fully staged position 1502. The cable seal retainer 1304 is attached to the male connector body 1302 by a latching mechanism 1504 that engages a pre-staged stop 1506 on an outer wall of the male connector body 1302 and engages a fully staged stop 1508 on the outer wall of the male connector body 1302.

Figure 16A:
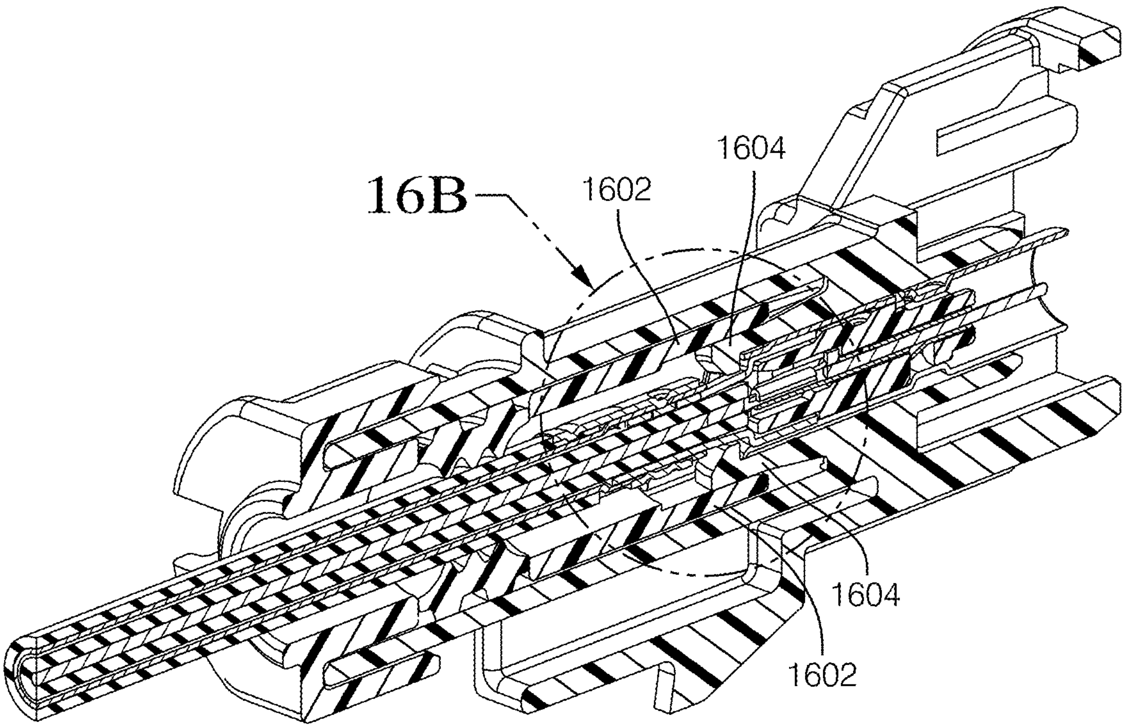
FIG. 16A is an isometric cross-sectional view of the male connector of FIG. 13 showing a TPA device in a non-blocking condition and providing primary lock reinforcement for a terminal lock when in the TPA device and the seal retainer are in the fully staged position after a terminal is fully inserted according to some embodiments.
Figure 16B:
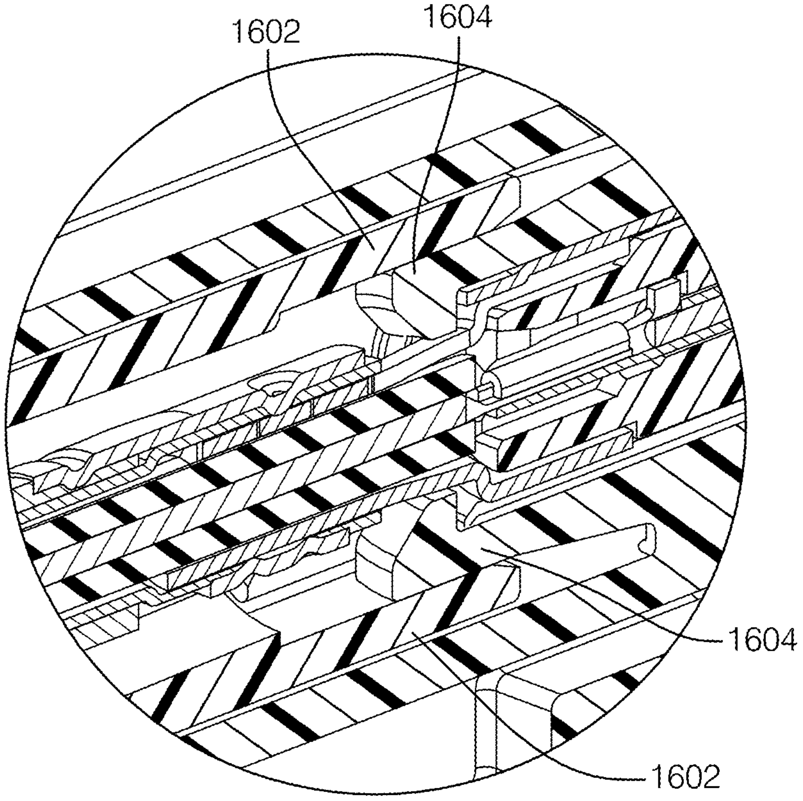
FIG. 16B is a close-up isometric cross-sectional view of the female connector of FIG. 16A showing the TPA device and seal retainer in the fully staged position according to some embodiments.

FIGS. 16A and 16B show cross section views of the TPA device 1410 in the fully staged position 1502. FIGS. 16A and 16B show rigid tabs 1602 of the TPA device 1410 disposed between terminal locking arms 1604 and the inner wall 1406 of the terminal cavity 1408, thereby providing positive lock reinforcement features that inhibits the terminal locking arms 1604 from inadvertently releasing the male terminal 1402.

Figure 17:
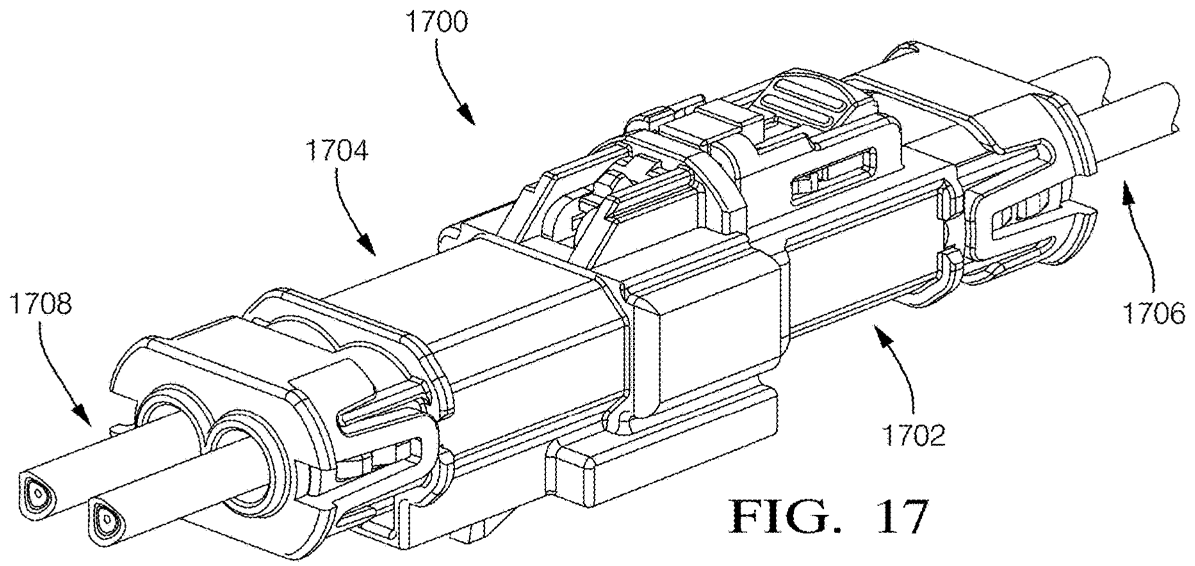
FIG. 17 is an isometric view of a two-way connector assembly according to some other embodiments.
Figure 18A:
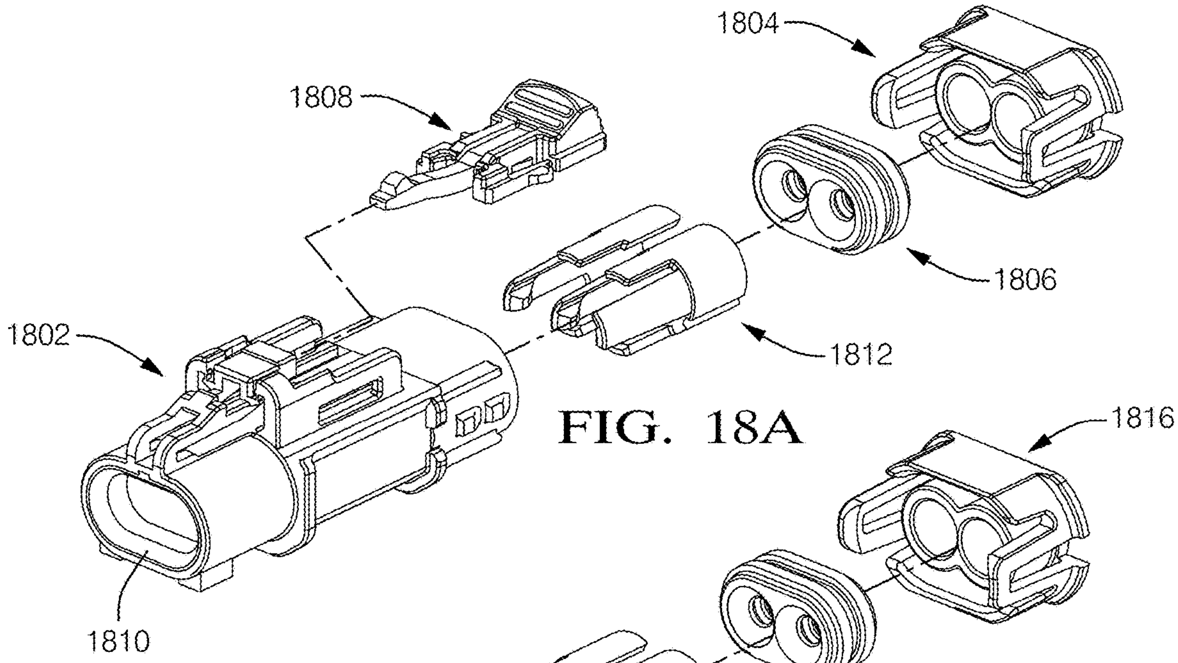
FIG. 18A is an exploded view of a female connector of the two-way connector assembly of FIG. 17 according to some embodiments.
Figure 18B:
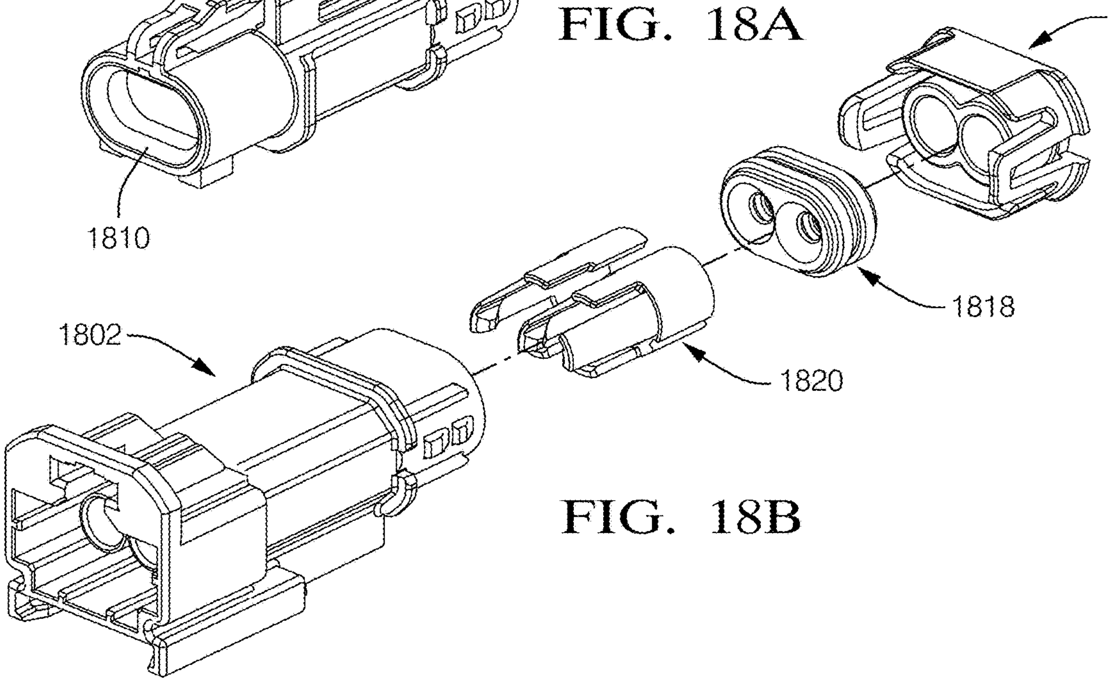
FIG. 18B is an exploded view of a male connector of the two-way connector assembly of FIG. 19 according to some embodiments.

FIGS. 17 through 18B show a non-limiting example of a two-way coaxial electrical connector assembly, hereafter referred to as the assembly 1700, according to some embodiments. The assembly 1700 includes a female connector 1702 and a mating male connector 1704. The female and male connectors 1702, 1704 terminate pairs of coaxial cables 1706 and 1708, respectively.

The female connector 1702 is illustrated in FIG. 18A. The female connector 1702 has a female connector body 1802 formed of an electrically insulative material such as polyamide (NYLON) or polybutylene terephthalate (PBT). The female connector 1702 also has a cable seal retainer 1804 that holds a mat cable seal 1806 within a terminal cavity (not shown) of the female connector body 1802, a connector position assurance (CPA) device 1808 that locks the female connector 1702 to the male connector 1704 when they are fully and properly mated, and a connector seal 1810 that inhibits environmental contaminants, such as water and dust, from intruding into the interface between the female and male connectors 1702, 1704. FIG. 18A also shows a terminal position assurance (TPA) device 1812 that is configured to assure that the female terminals (not shown) are properly seated within the terminal cavity. The female connector 1702 is configured such that the TPA device 1812 is blocked from moving from a pre-staged position in a more rearward portion of the female connector body 1802 to a fully staged position in a more forward portion of the female connector body 1802 unless the female terminals are properly seated within the terminal cavity, similarly to the operation of the TPA device 306 in the female connector 102.

Figure 19:
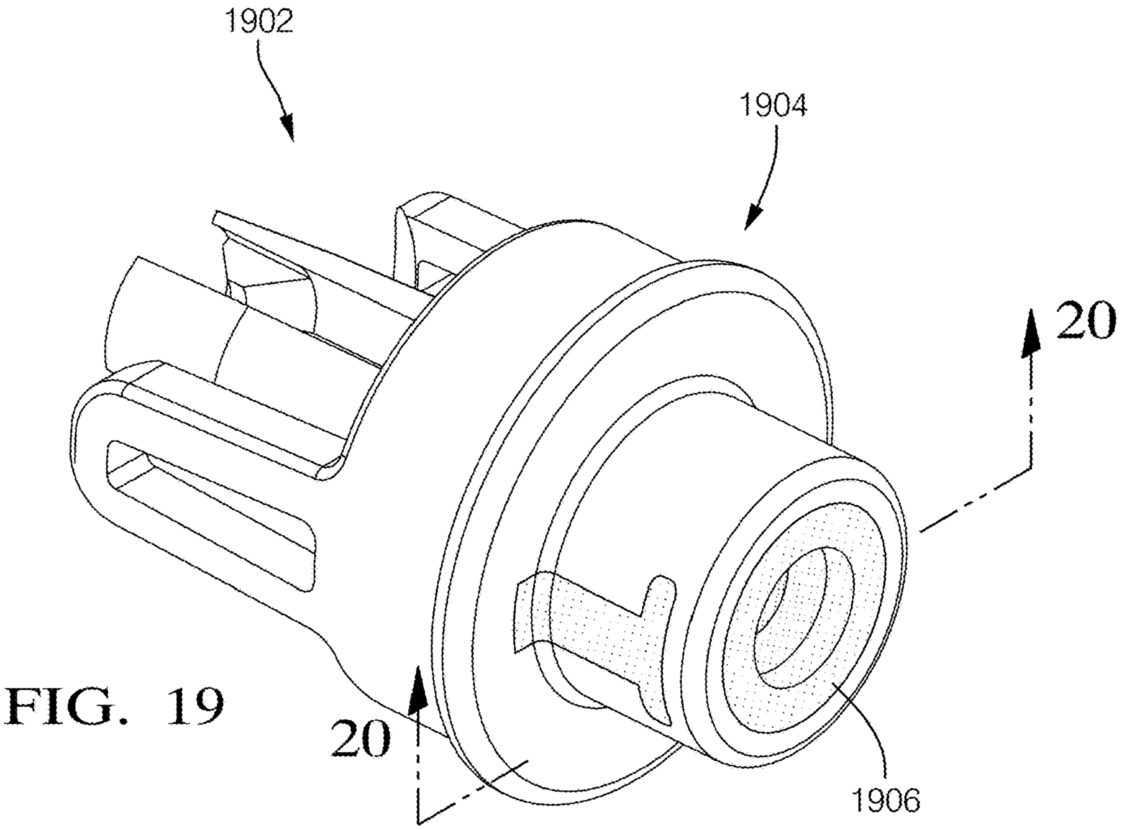
Figure 20:
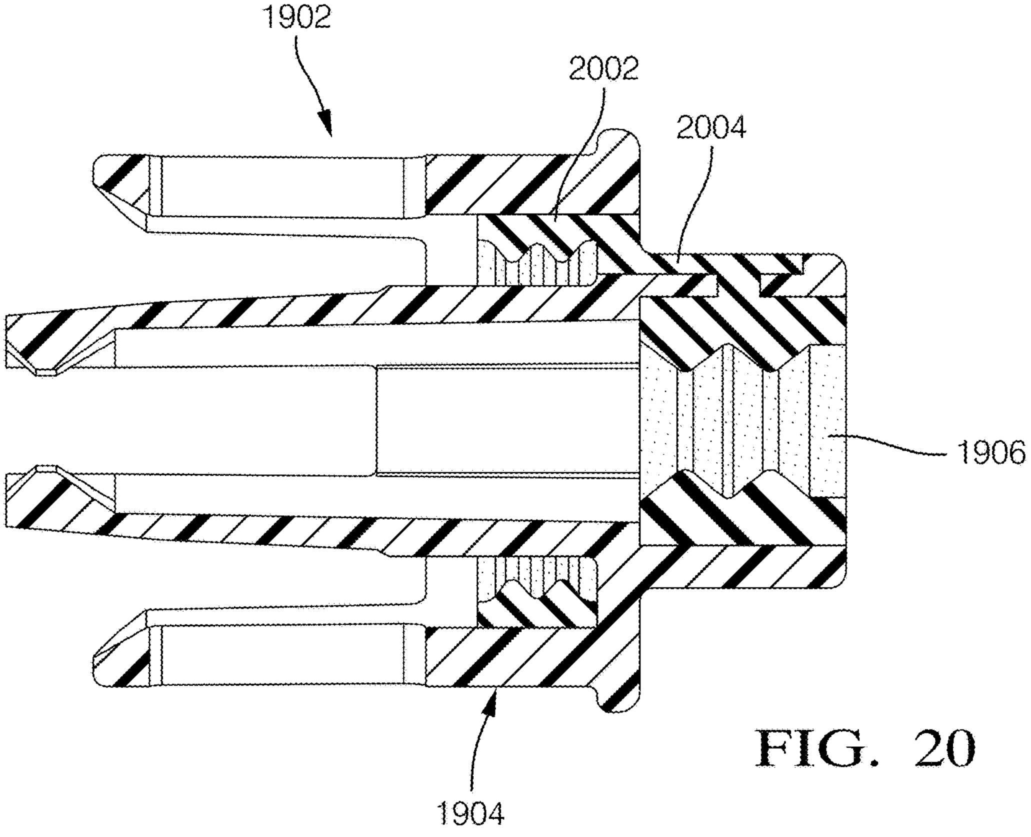
FIG. 20 is an isometric view of an alternative integrated seal retainer/TPA device for the connector assembly of FIG. 1. according to some embodiments.
Figure 21:
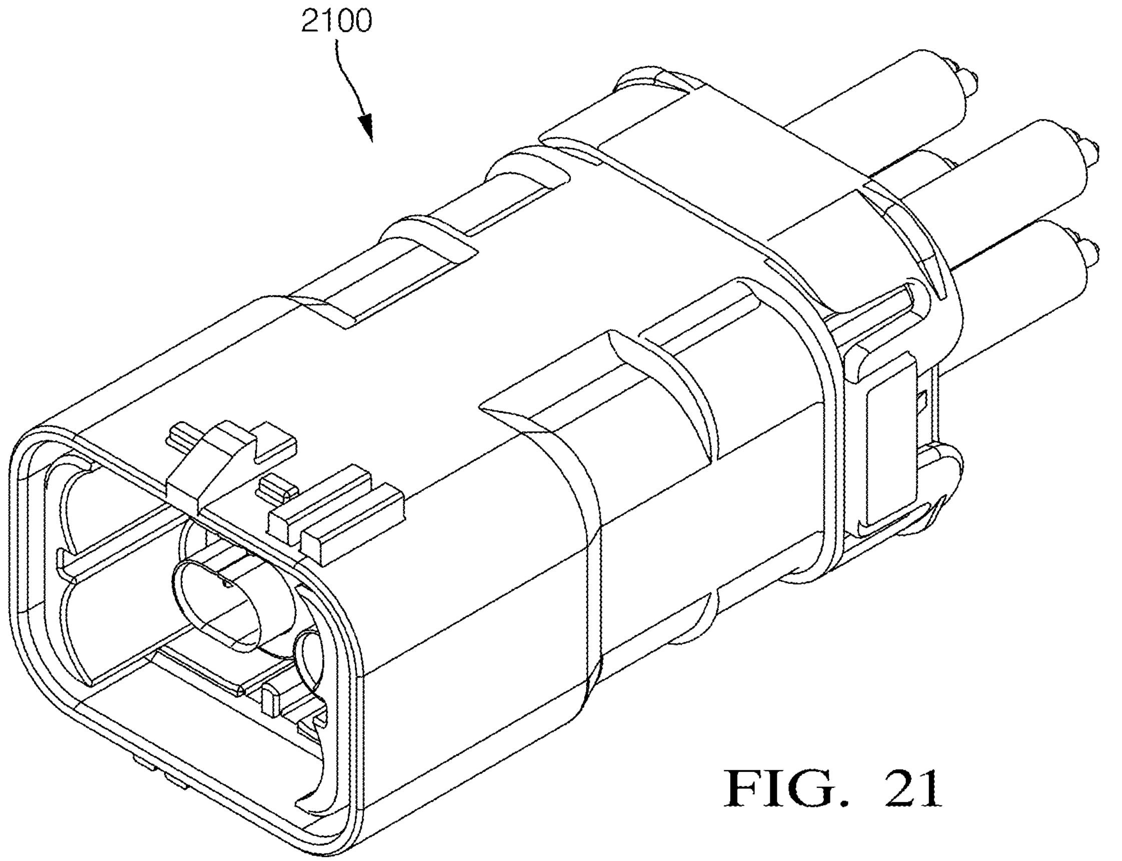
FIG. 21 is an isometric view of a connector of a High-Speed Modular Twisted-Pair Data (H-MTD) connector system according to yet more embodiments.

The male connector 1704 is illustrated in FIG. 18B. The male connector 1704 has a male connector body 1814 formed of an electrically insulative material such as polyamide (NYLON) or polybutylene terephthalate (PBT). The male connector 1704 also has a cable seal retainer 1816 that holds a mat cable seal 1818 within a terminal cavity (not shown) of the male connector body 1814. The mat cable seal 1818 is disposed between an inner wall of the terminal cavity and the coaxial cables and a terminal position assurance (TPA) device 1820 that is configured to assure that the male coaxial terminals are properly seated within the terminal cavity. The male connector 1704 is configured such that the TPA device 1820 is blocked from moving from a pre-staged position in a more rearward portion of the male connector body 1814 to a fully staged position in a more forward portion of the male connector body 1814 unless the male terminals are properly seated within the terminal cavity, similarly to the operation of the TPA device 1410 in the male connector 104:

FIGS. 19 and 20 show an alternate embodiment of a TPA device 1902, similar in function and form to those TPA devices 306, 1410 described above. This TPA device 1902 includes an integrally formed seal retainer 1904 and cable seal 1906. This TPA device 1902 further includes a connector body seal 2002 that is integrally formed therewith and preferably co molded with the TPA device 1902. The connector body seal 2002 and the cable seal 1906 are interconnected by a channel 2004 in the TPA device 1902 that allows both seals 1906, 2002 to be molded through a single gate using an injection molding process. In other alternative embodiments, a TPA device and seal retainer may be integral and use a separate cable seal or lack a cable seal in unsealed connector applications.

Figure 22:
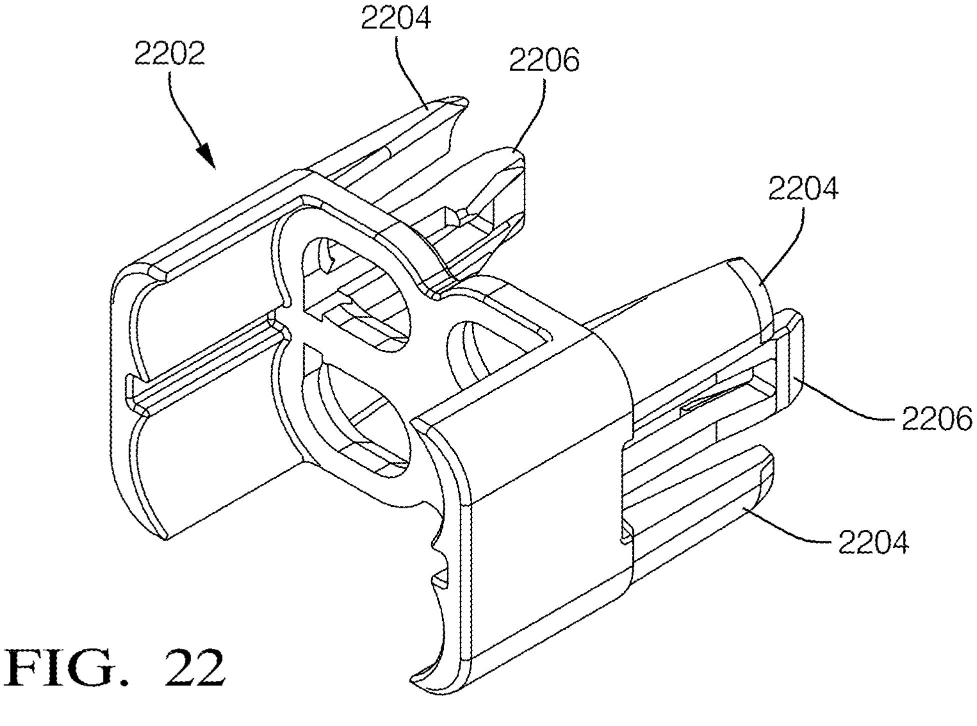
FIG. 22 is an isometric view of a TPA device of the connector system of FIG. according to some embodiments
Figure 23A:
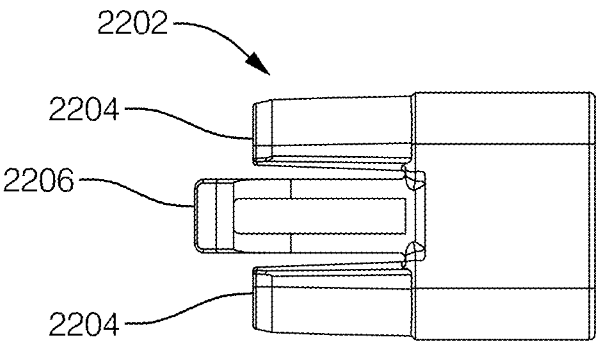
FIG. 23A is side view of the TPA device of the connector system of FIG. 22 according to some embodiments.
Figure 23B:
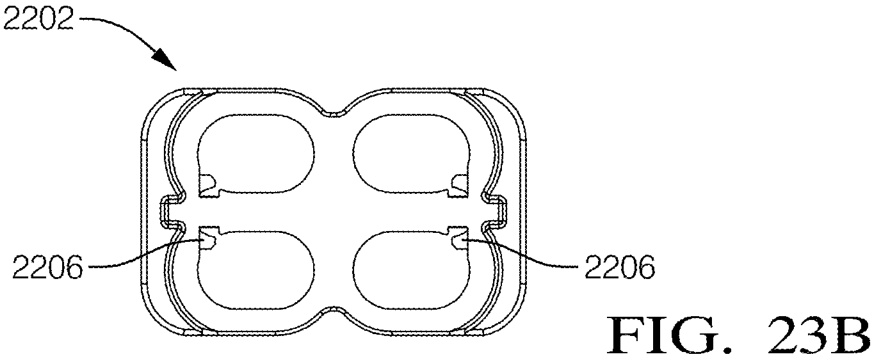
FIG. 23B is rear view of the TPA device of the connector system of FIG. 22 according to some embodiments.
Figure 23C:
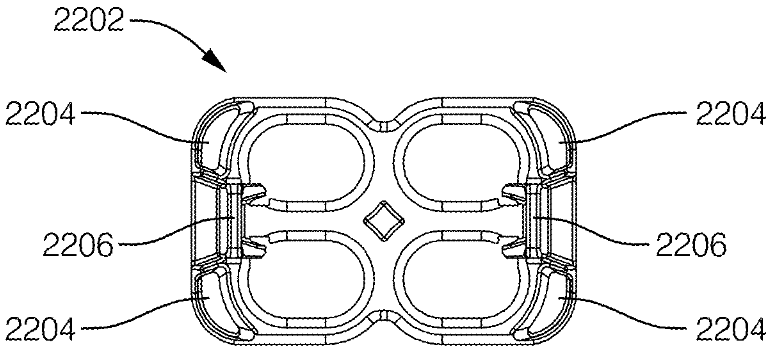
FIG. 23C is front view of the TPA device of the connector system of FIG. 22 according to some embodiments.
Figure 23D:
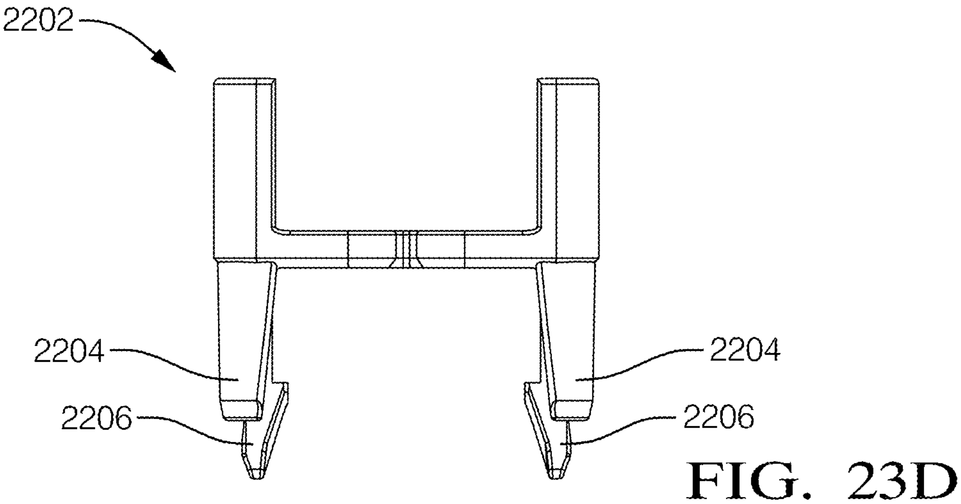
FIG. 23D is side view of the TPA device of the connector system of FIG. 22 according to some embodiments.
Figure 24:
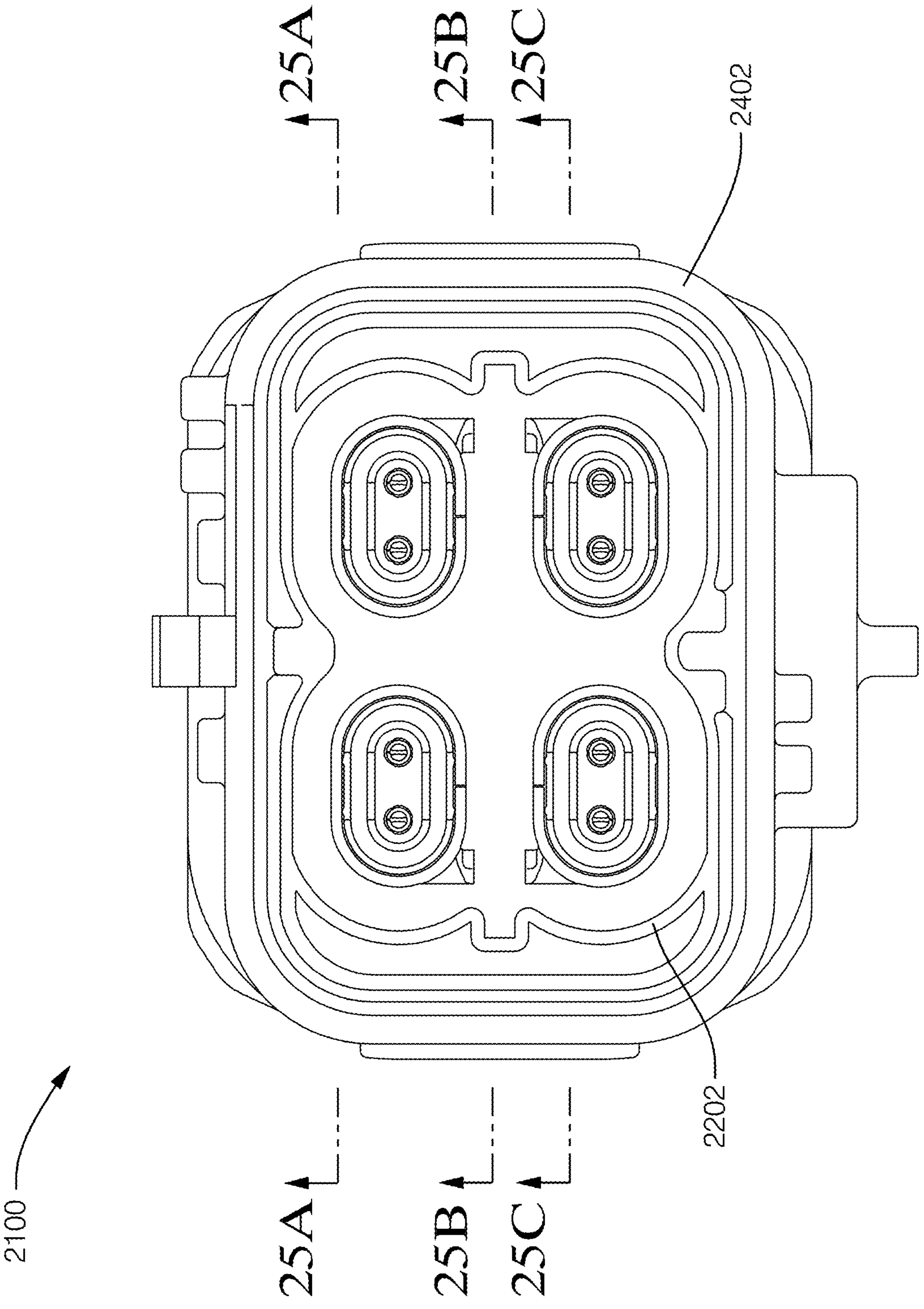
FIG. 24 is front view of the H-MTD connector system of FIG. 21 illustrating the section planes of FIGS. 25A to 25C according to some embodiments.
Figure 25A:
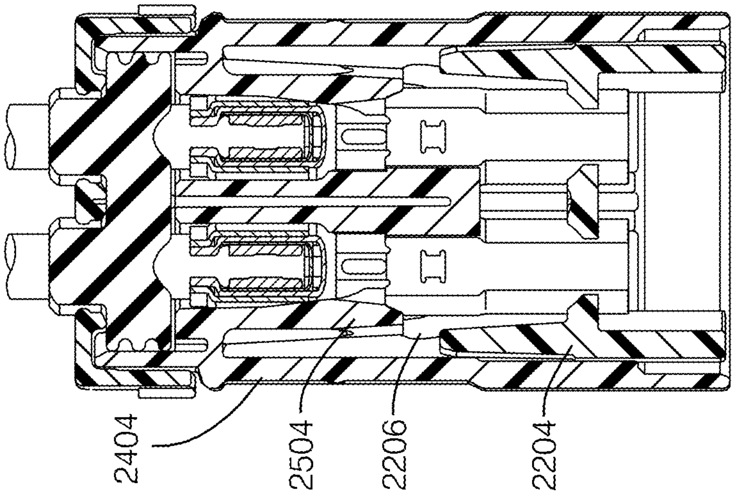
FIG. 25A is a cross section view of the H-MTD connector system of FIG. 21 along the section plane A-A of FIG. 24 with the TPA device in a pre-staged position according to some embodiments.
Figure 25B:
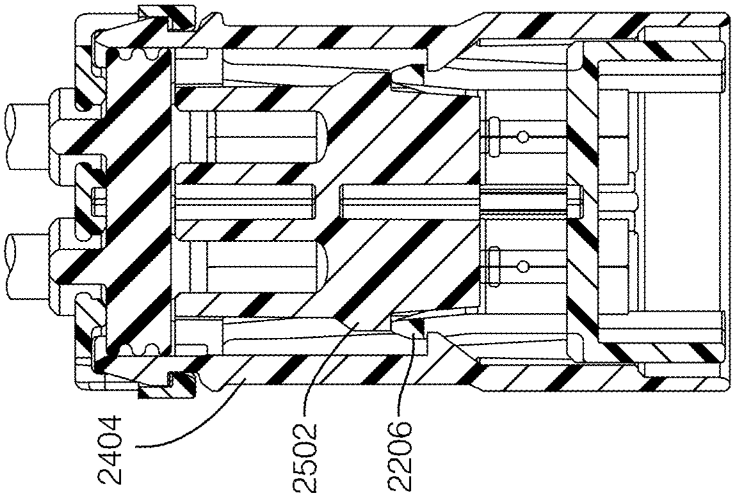
FIG. 25B is a cross section view of the H-MTD connector system of FIG. 21 along the section plane B-B of FIG. 24 with the TPA device in the pre-staged position according to some embodiments.
Figure 25C:
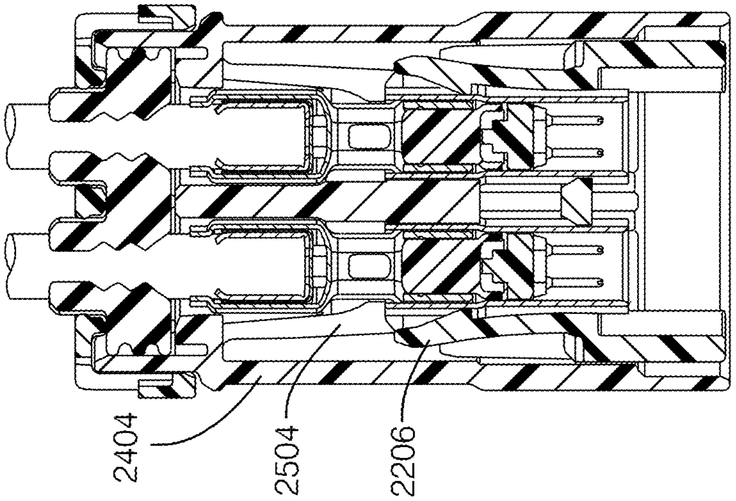
FIG. 25C is a cross section view of the H-MTD connector system of FIG. 21 along the section plane B-B of FIG. 24 with the TPA device in the pre-staged position according to some embodiments.

FIGS. 21 through 27C show another non-limiting example of a High-Speed Modular Twisted-Pair Data (H-MTD) connector system, hereafter referred to as the assembly 2100, according to some embodiments. The assembly 2100 includes a TPA device 2202, as shown in FIGS. 22 to 23D, that has terminal primary lock reinforcement arms 2204 and secondary terminal locking arms 2206. The assembly 2100 also includes a connector body 2402 having stop ridges 2502 projecting from an inner wall of the connector body 2402 and terminal locking arms 2504. The TPA device 2202 is shown in the pre-staged position in FIGS. 25A-25C. The TPA device 2202 is shown in the fully staged position in FIGS. 27A-27C. The operation of the assembly 2100 is very similar to that of assembly 170. The primary difference being that the TPA device 2202 shown in FIG. 22 is inserted within the mating connector insertion end 2206 of the connector body 2208 rather than the cable insertion end 2210 as in assembly 1700.

While the example connector assemblies 100, 200 in FIGS. 1-20 are illustrated as coaxial cable connectors and the example connector assembly 300 in FIGS. 21-25B are illustrated as twisted pair cable connectors, alternative embodiment may be envisioned in which the example connector assemblies 100, 200 in FIGS. 1-20 are configured to interconnect twisted pair cables or the connector assembly 300 of FIGS. 21-25B is configured to interconnect coaxal cables. In yet other alternative embodiments, the connector assemblies 100, 200, 300 of FIGS. 1-25B may be hybrid connectors that are configured to interconnect both coaxial and twisted pair cables.

Figure 26:
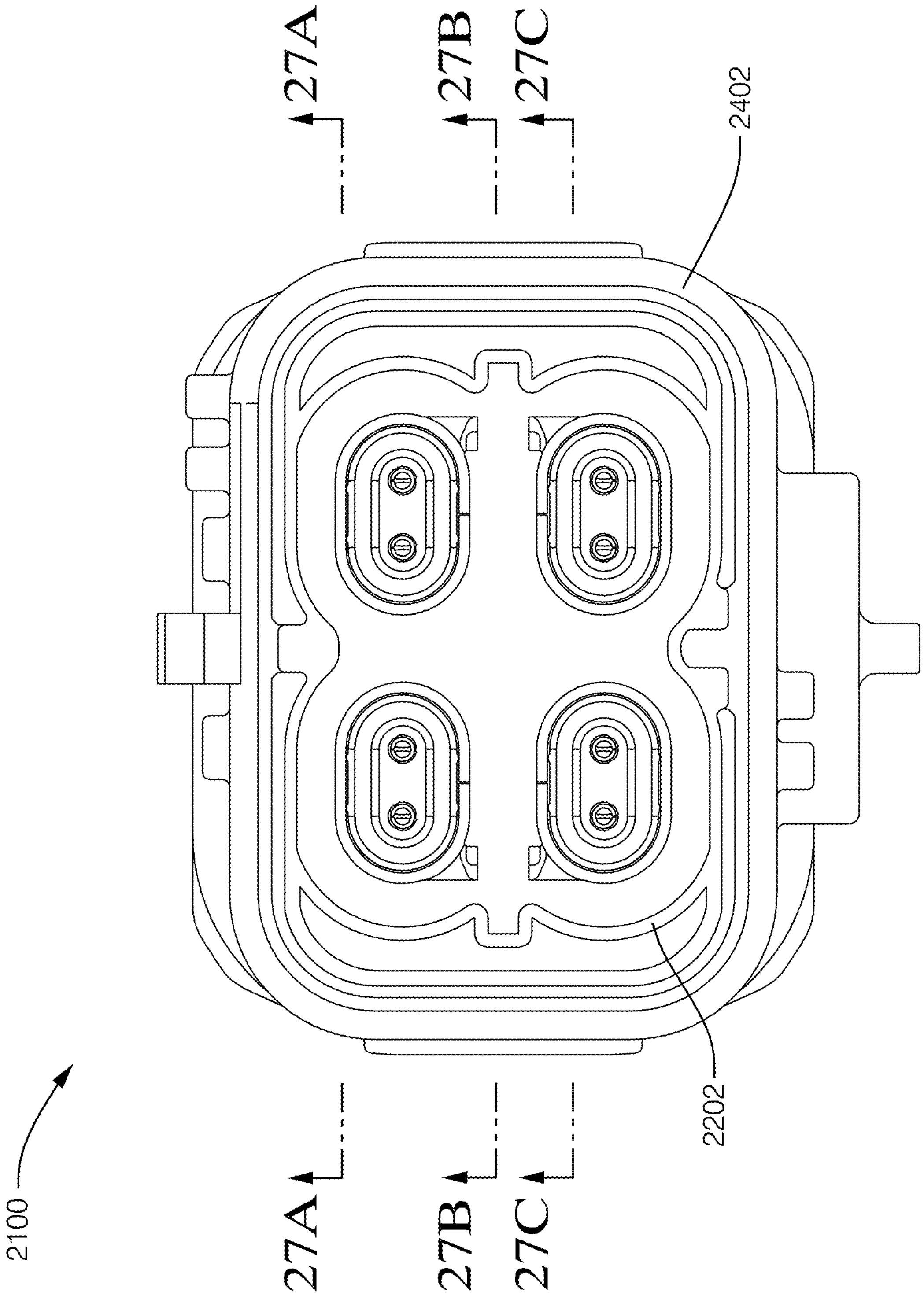
FIG. 26 is front view of the H-MTD connector system of FIG. 21 illustrating the section planes of FIGS. 27A to 27C according to some embodiments.
Figure 27C:
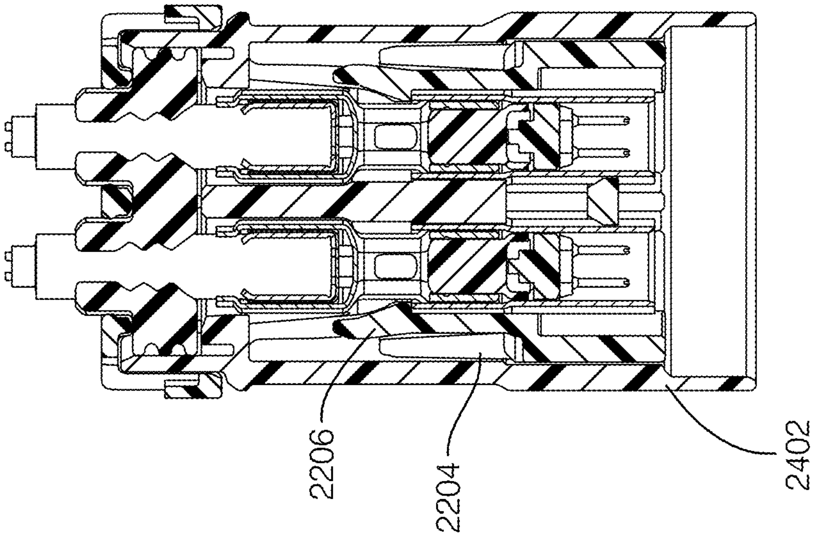
FIG. 27C is a cross section view of the H-MTD connector system of FIG. 21 along the section plane B-B of FIG. 26 with the TPA device in the fully staged position according to some embodiments.
Figure 27B:
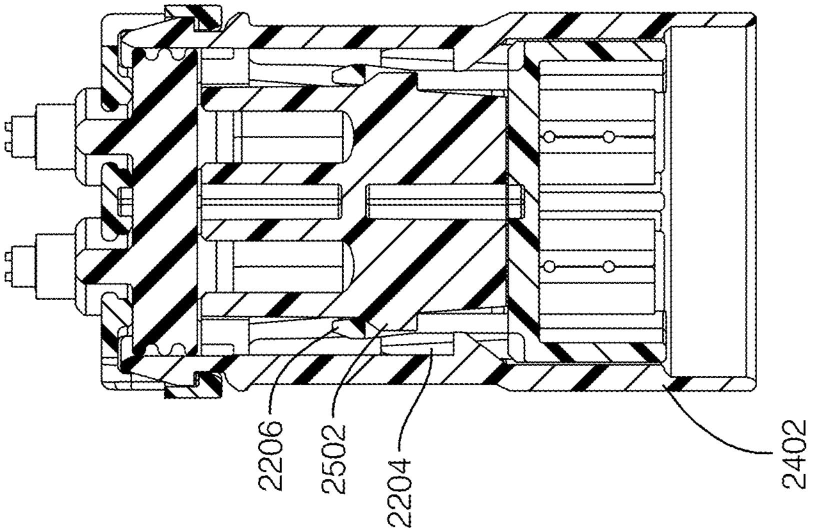
FIG. 27B is a cross section view of the H-MTD connector system of FIG. 21 along the section plane E-E of FIG. 26 with the TPA device in the fully staged position according to some embodiments.
Figure 27A:
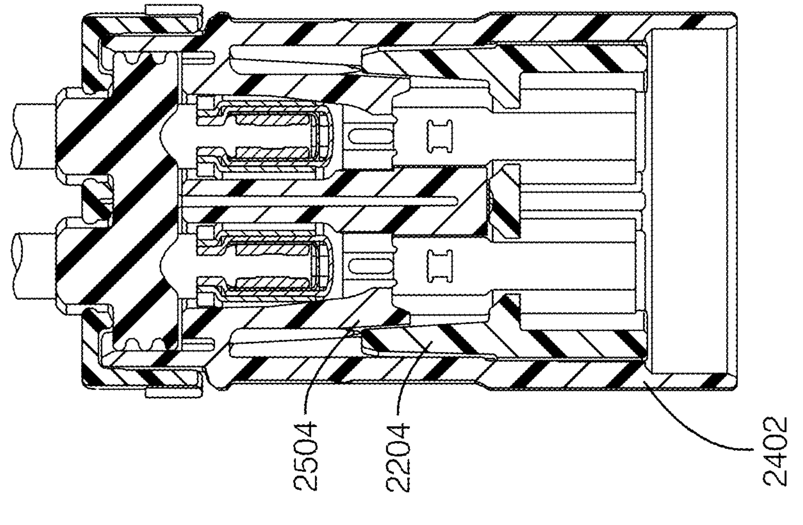
FIG. 27A is a cross section view of the H-MTD connector system of FIG. 21 along the section plane D-D of FIG. 26 with the TPA device in a fully staged position according to some embodiments.
Figure 28:
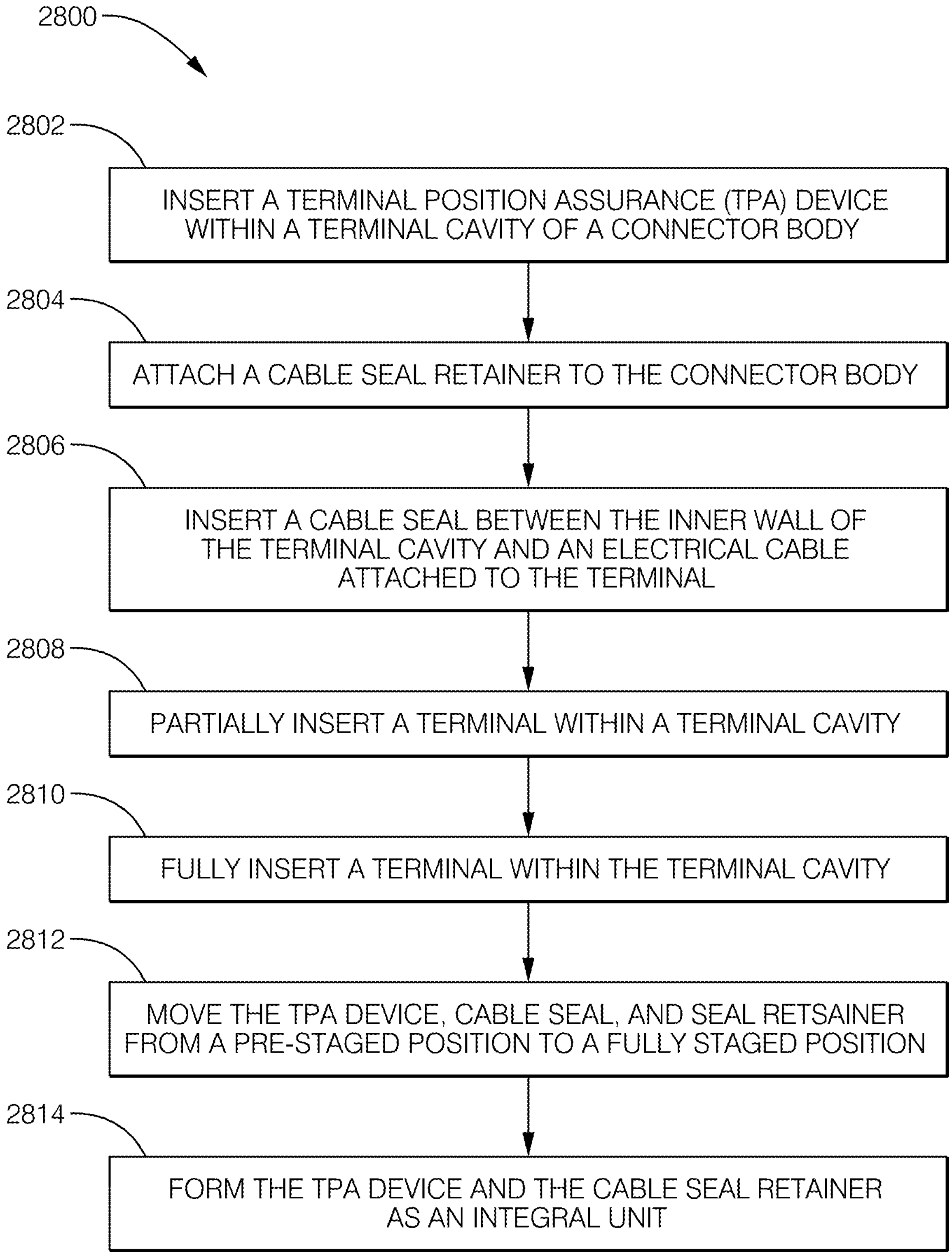
FIG. 28 is a flow chart for a method of putting a connector assembly together according to some embodiments.

A method/process 2800 of assembling a connector assembly, e.g., any one of the assemblies 100, 1700, 2100 presented herein is illustrated in FIG. 26 and includes one or more of the following steps:

STEP 2802, INSERT A TERMINAL POSITION ASSURANCE (TPA) DEVICE WITHIN A TERMINAL CAVITY OF A CONNECTOR BODY, includes inserting a terminal position assurance (TPA) device, e.g. TPA device 306, within a terminal cavity, e.g. terminal cavity 402, of a connector body, e.g., female connector body 202, and holding the TPA device in a pre-staged position, e.g. pre-staged position 502, via contact between a stop ridge, e.g. stop ridges 508, projecting from an inner wall, e.g. inner wall 404, of the connector body into the terminal cavity and a free end of a cantilevered flexible arm, e.g. flexible arms 506, extending from the TPA device, thereby creating a first blocking condition for the TPA device;

STEP 2804, PARTIALLY INSERTING A TERMINAL WITHIN A TERMINAL CAVITY, includes partially inserting a terminal, e.g. female terminal 302, within the terminal cavity which contacts the flexible arm, thereby moving the free end out of contact with the stop ridge and clearing the first blocking condition for the TPA device. The terminal further comes in contact with a flexible terminal lock, e.g., terminal locking arms 902, and pushes the terminal lock into contact with a tab, e.g., tabs 904, defined by the TPA device, thereby holding the TPA device in the pre-staged position by creating a second blocking condition for the TPA device;

STEP 2806, FULLY INSERT THE TERMINAL WITHIN THE TERMINAL CAVITY, includes fully inserting the terminal within the terminal cavity. The terminal lock engages the terminal as it is returned to an unflexed condition, thereby moving the terminal lock out of contact with the tab, clearing the second blocking condition, and creating a non-blocking condition for the TPA device that allows the TPA device to be moved from the pre-staged position to a fully staged position, e.g., fully staged position 1102;

STEP 2808, MOVE THE TPA DEVICE FROM THE PRE-STAGED POSITION TO THE FULLY STAGED POSITION, includes moving the TPA device from the pre-staged position to the fully staged position;

STEP 2810, INSERT A CABLE SEAL BETWEEN THE INNER WALL OF THE TERMINAL CAVITY AND AN ELECTRICAL CABLE ATTACHED TO THE TERMINAL, includes inserting a cable seal, e.g., cable seal 304, between the inner wall of the terminal cavity and an electrical cable, e.g., coaxial cable 106, attached to the terminal;

STEP 2812, ATTACH A CABLE SEAL RETAINER TO THE CONNECTOR BODY, includes attaching a cable seal retainer, e.g., cable seal retainer 204, to the connector body. The cable seal retainer is moveable from the pre-staged position to the fully staged position only when the TPA device is moveable from the pre-staged position to the fully staged position; and STEP 2814, FORM THE TPA DEVICE AND THE CABLE SEAL RETAINER AS AN INTEGRAL UNIT, includes forming the TPA device and the cable seal retainer as an integral unit, e.g., TPA device 1902.

Benefits of the connector assemblies shown in FIGS. 1-26B include easier assembly at wiring harness assembly plant. For example, the connector assemblies only require inserting the terminal and moving the seal retainer/TPA device/seal from the pre-staged position to the fully staged position. Additionally, the blocking feature eliminates the need of special packaging for the connector to ensure against premature activation of the TPA device, which reduces cycle/assembly time at wiring harness assembly plant. In some embodiments, this allows flex machine assembly. The force required to move from the TPA device from pre-staged position to the full fully staged position is applied to the seal retainer, which in turn is applied/transferred to all components (e.g., TPA device, seal, etc.).

While the examples presented herein is directed to electrical connector assemblies, alternative embodiments of the connector assembly may be envisioned that are configured to interconnect fiber optic cables, pneumatic tubes, hydraulic tubes, or a hybrid connector assembly having a combination of any of these types of conductors.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, ‘one or more’ includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector assembly, comprising:

a connector body having a terminal cavity configured to receive a terminal, a terminal locking arm configured to secure the terminal within the terminal cavity, and a stop ridge projecting from an inner wall of the connector body into the terminal cavity; and a terminal position assurance (TPA) device inserted within the terminal cavity and moveable from a pre-staged position to a fully staged position deeper within the terminal cavity, the TPA device being inhibited from moving from the pre-staged position to fully staged position prior to the terminal being inserted into the terminal cavity by a first blocking condition caused by interference between the TPA device and the stop ridge, the TPA device being inhibited from moving from the pre-staged position to the fully staged position by a second blocking condition caused by interference between the TPA device and the terminal locking arm as the terminal locking arm is flexed by the terminal as the terminal is inserted into the terminal cavity, and the TPA device being allowed to move from the pre-staged position to the fully staged position after the terminal is fully seated within the terminal cavity and the terminal locking arm returns to an unflexed condition after the terminal locking arm secures the terminal within the terminal cavity, the TPA device comprising a cantilevered flexible arm disposed between the terminal locking arm and the inner wall of the connector body, the cantilevered flexible arm being oriented such that it flexes toward the inner wall during terminal insertion and returns to engage the terminal after insertion, thereby providing staged retention distinct from the terminal locking arm.

2. The connector assembly in accordance with claim 1, wherein the cantilevered flexible arm of the TPA device engages the stop ridge in the first blocking condition and wherein the terminal comes in contact with the cantilevered flexible arm and moves the cantilevered flexible arm out of engagement with the stop ridge as the terminal is inserted within the terminal cavity, thereby clearing the first blocking condition.

3. The connector assembly in accordance with claim 2, wherein a free end of the cantilevered flexible arm defines a ramp configured to contact the terminal and move the cantilevered flexible arm out of engagement with the stop ridge as the terminal is inserted within the terminal cavity, thereby clearing the first blocking condition.

4. The connector assembly in accordance with claim 2, wherein the cantilevered flexible arm has an arcuate shape and wherein the cantilevered flexible arm is configured such that a free end of the cantilevered flexible arm is closer to a centerline of the terminal cavity than a fixed end of the cantilevered flexible arm prior to insertion of the terminal within the terminal cavity.

5. The connector assembly in accordance with claim 2, wherein the stop ridge is mounted on a pedestal extending from the inner wall of the connector body and wherein the cantilevered flexible arm is disposed between the stop ridge and the inner wall after the cantilevered flexible arm is flexed out of engagement with the stop ridge.

6. The connector assembly in accordance with claim 2, wherein the cantilevered flexible arm is disposed between the terminal locking arm and the inner wall of the connector body when the TPA device is in the fully staged position.

7. The connector assembly in accordance with claim 1, wherein the terminal and the TPA devices are inserted into a common end of the connector body.

8. The connector assembly in accordance with claim 1, wherein the terminal and the TPA devices are inserted into opposite ends of the connector body.

9. The connector assembly in accordance with claim 1, further comprising:

a cable seal disposed between an inner wall of the terminal cavity and an electrical cable attached to the terminal; and a cable seal retainer attached to the connector body and configured to be moveable from the pre-staged position to the fully staged position when the TPA device is moved from the pre-staged position to the fully staged position.

10. The connector assembly in accordance with claim 9, wherein the cable seal retainer is blocked from moving from the pre-staged position to the fully staged position when the TPA device is in the pre-staged position.

11. The connector assembly in accordance with claim 9, wherein the cable seal retainer and the TPA device are formed as an integral unit.

12. The connector assembly in accordance with claim 9, wherein the cable seal retainer, the TPA device, and the cable seal are formed as an integral unit, wherein the cable seal retainer further includes a connector body seal disposed between the cable seal retainer and the connector body.

13. The connector assembly in accordance with claim 12, wherein the cable seal retainer is integrally formed with the connector body seal.

14. A method of assembling a connector, comprising:

inserting a terminal position assurance (TPA) device within a terminal cavity of a connector body and holding the TPA device in a pre-staged position via contact between a stop ridge projecting from an inner wall of the connector body into the terminal cavity and a free end of a cantilevered flexible arm extending from the TPA device and disposed between the terminal locking arm and the inner wall of the connector body, the cantilevered flexible arm being oriented such that it flexes toward the inner wall during terminal insertion and returns to engage the terminal after insertion, thereby providing staged retention distinct from the terminal locking arm and further providing a first blocking condition for the TPA device;

partially inserting a terminal within the terminal cavity which contacts the cantilevered flexible arm, thereby moving the free end out of contact with the stop ridge and clearing the first blocking condition for the TPA device, the terminal further coming in contact with a terminal locking arm and pushes the terminal locking arm into contact with a tab defined by the TPA device, thereby holding the TPA device in the pre-staged position by creating a second blocking condition for the TPA device;

fully inserting the terminal within the terminal cavity, the terminal locking arm engaging the terminal and returning to an unflexed condition, thereby moving the terminal locking arm out of contact with the tab, clearing the second blocking condition, and creating a non-blocking condition for the TPA device that allows the TPA device to be moved from the pre-staged position to a fully staged position; and moving the TPA device from the pre-staged position to the fully staged position.

15. The method in accordance with claim 14, wherein the cantilevered flexible arm is disposed between the terminal locking arm and the inner wall of the connector body when the TPA device is in the fully staged position.

16. The method in accordance with claim 14, further comprising:

inserting a cable seal between an inner wall of the terminal cavity and an electrical cable attached to the terminal; and attaching a cable seal retainer to the connector body, wherein the cable seal retainer is moveable from the pre-staged position to the fully staged position only when the TPA device is moveable from the pre-staged position to the fully staged position.

17. The method in accordance with claim 16, further comprising: forming the TPA device and the cable seal retainer as an integral unit.

18. A connector assembly manufactured by a process, comprising:

inserting a terminal position assurance (TPA) device within a terminal cavity of a connector body and holding the TPA device in a pre-staged position via contact between a stop ridge projecting from an inner wall of the connector body into the terminal cavity and a free end of a cantilevered flexible arm extending from the TPA device and disposed between the terminal locking arm and the inner wall of the connector body, the cantilevered flexible arm being oriented such that it flexes toward the inner wall during terminal insertion and returns to engage the terminal after insertion, thereby providing staged retention distinct from the terminal locking arm and further providing a first blocking condition for the TPA device;

partially inserting a terminal within the terminal cavity which contacts the cantilevered flexible arm, thereby moving the free end of the cantilevered flexible arm out of contact with the stop ridge and clearing the first blocking condition for the TPA device, the terminal further coming in contact with a terminal locking arm and pushing the terminal locking arm into contact with a tab defined by the TPA device, thereby holding the TPA device in the pre-staged position by creating a second blocking condition for the TPA device;

fully inserting the terminal within the terminal cavity, the terminal locking arm engaging the terminal and returning to an unflexed condition, thereby moving the terminal locking arm out of contact with the tab, clearing the second blocking condition, and creating a non-blocking condition for the TPA device that allows the TPA device to be moved from the pre-staged position to a fully staged position; and moving the TPA device from the pre-staged position to the fully staged position.

19. The connector assembly in accordance with claim 18, the process further comprising:

inserting a cable seal between the inner wall of the terminal cavity and an electrical cable attached to the terminal; and attaching a cable seal retainer to the connector body, wherein the cable seal retainer is moveable from the pre-staged position to the fully staged position only when the TPA device is moveable from the pre-staged position to the fully staged position.

20. The connector assembly in accordance with claim 19, the process further comprising: forming the TPA device and the cable seal retainer as an integral unit.

* * * * *